US011016859B2

(12) United States Patent
Prahlad et al.

(10) Patent No.: US 11,016,859 B2
(45) Date of Patent: *May 25, 2021

(54) DE-DUPLICATION SYSTEMS AND METHODS FOR APPLICATION-SPECIFIC DATA

(71) Applicant: Commvault Systems, Inc., Tinton Falls, NJ (US)

(72) Inventors: Anand Prahlad, Bangalore (IN); Manoj Kumar Vijayan, Marlboro, NJ (US); Rajiv Kottomtharayil, Marlboro, NJ (US); Parag Gokhale, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 343 days.

This patent is subject to a terminal disclaimer.

(21) Appl. No.: 15/991,849

(22) Filed: May 29, 2018

(65) Prior Publication Data

US 2019/0012237 A1   Jan. 10, 2019

Related U.S. Application Data

(63) Continuation of application No. 15/198,269, filed on Jun. 30, 2016, now abandoned, which is a
(Continued)

(51) Int. Cl.
*G06F 7/00* (2006.01)
*G06F 11/14* (2006.01)
(Continued)

(52) U.S. Cl.
CPC ...... *G06F 11/1453* (2013.01); *G06F 11/1448* (2013.01); *G06F 11/1464* (2013.01);
(Continued)

(58) Field of Classification Search
CPC .............. G06F 11/1453; G06F 16/162; G06F 16/1748; G06F 16/9574; G06F 21/604;
(Continued)

(56) References Cited

U.S. PATENT DOCUMENTS 4,084,231 A   4/1978   Capozzi et al.
4,267,568 A   5/1981   Dechant et al.
(Continued)

FOREIGN PATENT DOCUMENTS

EP   0259912   3/1988
EP   0405926   1/1991
(Continued)

OTHER PUBLICATIONS

Armstead et al., "Implementation of a Campus-Wide Distributed Mass Storage Service: The Dream vs. Reality," IEEE, 1995, pp. 190-199.
(Continued)

*Primary Examiner* — Mohammed R Uddin
(74) *Attorney, Agent, or Firm* — Knobbe, Martens, Olson & Bear, LLP

(57) ABSTRACT

Content-aware systems and methods for improving de-duplication, or single instancing, in storage operations. In certain examples, backup agents on client devices parse application-specific data to identify data objects that are candidates for de-duplication. The backup agents can then insert markers or other indictors in the data that identify the location(s) of the particular data objects. Such markers can, in turn, assist a de-duplication manager to perform object-based de-duplication and increase the likelihood that like blocks within the data are identified and single instanced. In other examples, the agents can further determine if a data object of one file type can or should be single-instanced with a data object of a different file type. Such processing of data
(Continued)

on the client side can provide for more efficient storage and back-end processing.

20 Claims, 14 Drawing Sheets

Related U.S. Application Data continuation of application No. 13/931,654, filed on Jun. 28, 2013, now Pat. No. 9,405,763, which is a continuation of application No. 12/724,292, filed on Mar. 15, 2010, now Pat. No. 8,484,162.

(60) Provisional application No. 61/165,071, filed on Mar. 31, 2009.

(51) Int. Cl.
    *G06F 16/16* (2019.01)
    *G06F 16/174* (2019.01)
    *G06F 16/957* (2019.01)
    *G06F 21/60* (2013.01)

(52) U.S. Cl.
    CPC ........ *G06F 11/1469* (2013.01); *G06F 16/162* (2019.01); *G06F 16/1748* (2019.01); *G06F 16/9574* (2019.01); *G06F 21/604* (2013.01)

(58) Field of Classification Search
    CPC . G06F 1/1448; G06F 11/1464; G06F 11/1469
    See application file for complete search history.

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,403,639 A | 4/1995 | Belsan |
| 5,410,700 A | 4/1995 | Fecteau et al. |
| 5,420,996 A | 5/1995 | Aoyagi |
| 5,448,724 A | 9/1995 | Hayashi et al. |
| 5,454,099 A | 9/1995 | Myers et al. |
| 5,491,810 A | 2/1996 | Allen |
| 5,495,607 A | 2/1996 | Pisello et al. |
| 5,499,367 A | 3/1996 | Bamford et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,619,644 A | 4/1997 | Crockett et al. |
| 5,625,793 A | 4/1997 | Mirza |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,720,026 A | 2/1998 | Uemura |
| 5,729,743 A | 3/1998 | Squibb |
| 5,732,240 A | 3/1998 | Caccavale |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A * | 7/1998 | Whiting .............. G06F 11/1464 |
| 5,790,828 A | 8/1998 | Jost |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,875,478 A | 2/1999 | Blumenau |
| 5,875,481 A | 2/1999 | Ashton |
| 5,878,408 A | 3/1999 | Van Huben |
| 5,887,134 A | 3/1999 | Ebrahim |
| 5,901,327 A | 5/1999 | Ofek |
| 5,907,672 A | 5/1999 | Matze |
| 5,924,102 A | 7/1999 | Perks |
| 5,930,831 A | 7/1999 | Marsh et al. |
| 5,940,833 A | 8/1999 | Benson |
| 5,950,205 A | 9/1999 | Aviani, Jr. |
| 5,956,519 A | 9/1999 | Wise |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,038,379 A | 3/2000 | Fletcher et al. |
| 6,044,437 A * | 3/2000 | Reinders .............. G06F 12/0802 |
| | | 711/122 |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,163,856 A | 12/2000 | Dion |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,286,084 B1 | 9/2001 | Wexler et al. |
| 6,289,432 B1 | 9/2001 | Ault et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,353,878 B1 | 3/2002 | Dunham |
| 6,356,801 B1 | 3/2002 | Goodman et al. |
| 6,366,986 B1 | 4/2002 | St. Pierre |
| 6,366,988 B1 | 4/2002 | Skiba |
| 6,374,336 B1 | 4/2002 | Peters |
| 6,389,432 B1 | 5/2002 | Pothapragada et al. |
| 6,389,433 B1 * | 5/2002 | Bolosky .............. G06F 11/1453 |
| | | 707/749 |
| 6,397,308 B1 | 5/2002 | Ofek |
| 6,418,478 B1 | 7/2002 | Ignatius et al. |
| 6,421,711 B1 | 7/2002 | Blumenau et al. |
| 6,425,057 B1 | 7/2002 | Cherkasova et al. |
| 6,438,368 B1 | 8/2002 | Phillips |
| 6,487,561 B1 | 11/2002 | Ofek et al. |
| 6,496,850 B1 | 12/2002 | Bowman-Amuah |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,557,030 B1 | 4/2003 | Hoang |
| 6,557,089 B1 | 4/2003 | Reed |
| 6,564,228 B1 | 5/2003 | O'Connor |

(56) References Cited

U.S. PATENT DOCUMENTS

| | | | |
|---|---|---|---|
| 6,625,623 B1* | 9/2003 | Midgley | G06F 11/1451 707/640 |
| 6,658,436 B2 | 12/2003 | Oshinsky et al. | |
| 6,658,526 B2 | 12/2003 | Nguyen et al. | |
| 6,662,198 B2 | 12/2003 | Satyanarayanan | |
| 6,665,815 B1 | 12/2003 | Goldstein | |
| 6,704,730 B2 | 3/2004 | Moulton et al. | |
| 6,721,767 B2 | 4/2004 | De Meno et al. | |
| 6,732,125 B1 | 5/2004 | Autry | |
| 6,757,794 B2 | 6/2004 | Cabrera et al. | |
| 6,760,723 B2 | 7/2004 | Oshinsky et al. | |
| 6,760,812 B1 | 7/2004 | Degenaro et al. | |
| 6,779,093 B1 | 8/2004 | Gupta | |
| 6,789,161 B1 | 9/2004 | Blendermann | |
| 6,799,258 B1 | 9/2004 | Linde | |
| 6,810,398 B2 | 10/2004 | Moulton | |
| 6,823,377 B1 | 11/2004 | Wu et al. | |
| 6,865,655 B1 | 3/2005 | Andersen | |
| 6,886,020 B1 | 4/2005 | Zahavi | |
| 6,912,629 B1 | 6/2005 | West et al. | |
| 6,952,758 B2 | 10/2005 | Chron et al. | |
| 6,983,351 B2 | 1/2006 | Gibble | |
| 7,003,641 B2 | 2/2006 | Prahlad et al. | |
| 7,028,096 B1 | 4/2006 | Lee | |
| 7,035,880 B1 | 4/2006 | Crescenti et al. | |
| 7,065,619 B1* | 6/2006 | Zhu | G06F 11/1453 707/999.201 |
| 7,082,441 B1 | 7/2006 | Zahavi | |
| 7,085,904 B2 | 8/2006 | Mizuno et al. | |
| 7,100,089 B1 | 8/2006 | Phelps | |
| 7,103,617 B2 | 9/2006 | Phatak | |
| 7,107,298 B2 | 9/2006 | Prahlad et al. | |
| 7,107,395 B1 | 9/2006 | Ofek | |
| 7,117,246 B2 | 10/2006 | Christenson et al. | |
| 7,130,860 B2 | 10/2006 | Pachet | |
| 7,130,970 B2 | 10/2006 | Devassy et al. | |
| 7,143,091 B2 | 11/2006 | Charnock | |
| 7,155,465 B2 | 12/2006 | Lee | |
| 7,155,633 B2 | 12/2006 | Tuma | |
| 7,162,496 B2 | 1/2007 | Amarendran et al. | |
| 7,174,433 B2 | 2/2007 | Kottomtharayil et al. | |
| 7,194,454 B2 | 3/2007 | Hansen | |
| 7,197,665 B2 | 3/2007 | Goldstein | |
| 7,225,210 B2 | 5/2007 | Guthrie, II | |
| 7,243,163 B1 | 7/2007 | Friend et al. | |
| 7,246,207 B2 | 7/2007 | Kottomtharayil et al. | |
| 7,246,272 B2 | 7/2007 | Cabezas et al. | |
| 7,272,606 B2 | 9/2007 | Borthakur et al. | |
| 7,284,030 B2 | 10/2007 | Ackaouy et al. | |
| 7,287,252 B2 | 10/2007 | Bussiere et al. | |
| 7,315,923 B2 | 1/2008 | Retnamma et al. | |
| 7,343,356 B2 | 3/2008 | Prahlad | |
| 7,343,453 B2 | 3/2008 | Prahlad et al. | |
| 7,343,459 B2 | 3/2008 | Prahlad | |
| 7,346,751 B2 | 3/2008 | Prahlad | |
| 7,383,462 B2 | 6/2008 | Osaki et al. | |
| 7,389,311 B1 | 6/2008 | Crescenti et al. | |
| 7,395,282 B1 | 7/2008 | Crescenti et al. | |
| 7,412,583 B2 | 8/2008 | Burton | |
| 7,437,388 B1 | 10/2008 | DeVos | |
| 7,440,982 B2 | 10/2008 | Lu et al. | |
| 7,454,569 B2 | 11/2008 | Kavuri et al. | |
| 7,472,238 B1 | 12/2008 | Gokhale et al. | |
| 7,472,242 B1 | 12/2008 | Deshmukh et al. | |
| 7,490,207 B2 | 2/2009 | Amarendran et al. | |
| 7,500,053 B1 | 3/2009 | Kavuri et al. | |
| 7,512,595 B1 | 3/2009 | McBride et al. | |
| 7,516,186 B1 | 4/2009 | Borghetti et al. | |
| 7,519,726 B2 | 4/2009 | Palliyll et al. | |
| 7,529,782 B2 | 5/2009 | Prahlad et al. | |
| 7,536,291 B1 | 5/2009 | Vijayan et al. | |
| 7,539,710 B1 | 5/2009 | Haustein et al. | |
| 7,543,125 B2 | 6/2009 | Gokhale | |
| 7,546,324 B2 | 6/2009 | Prahlad et al. | |
| 7,552,358 B1 | 6/2009 | Asgar-Deen et al. | |
| 7,567,188 B1* | 7/2009 | Anglin | G06F 3/0608 341/63 |
| 7,568,080 B2 | 7/2009 | Prahlad et al. | |
| 7,574,692 B2 | 8/2009 | Herscu | |
| 7,577,806 B2 | 8/2009 | Rowan | |
| 7,581,077 B2 | 8/2009 | Ignatius et al. | |
| 7,584,338 B1 | 9/2009 | Bricker et al. | |
| 7,603,386 B2 | 10/2009 | Amarendran et al. | |
| 7,606,844 B2 | 10/2009 | Kottomtharayil | |
| 7,613,748 B2 | 11/2009 | Brockway et al. | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,631,194 B2 | 12/2009 | Wahlert et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Prahlad et al. | |
| 7,664,771 B2 | 2/2010 | Kusters | |
| 7,685,126 B2 | 3/2010 | Patel et al. | |
| 7,702,782 B1 | 4/2010 | Pai | |
| 7,720,841 B2 | 5/2010 | Gu et al. | |
| 7,730,113 B1* | 6/2010 | Payette | G06Q 10/00 707/821 |
| 7,734,669 B2 | 6/2010 | Kottomtharayil et al. | |
| 7,734,820 B1 | 6/2010 | Ranade et al. | |
| 7,739,235 B2 | 6/2010 | Rousseau | |
| 7,743,051 B1* | 6/2010 | Kashyap | G06F 16/2471 707/713 |
| 7,747,577 B2* | 6/2010 | Cannon | G06F 11/1464 707/650 |
| 7,747,579 B2 | 6/2010 | Prahlad et al. | |
| 7,761,425 B1 | 7/2010 | Erickson et al. | |
| 7,779,032 B1* | 8/2010 | Garfinkel | G06F 16/10 707/776 |
| 7,797,279 B1 | 9/2010 | Starling et al. | |
| 7,801,864 B2 | 9/2010 | Prahlad et al. | |
| 7,809,914 B2 | 10/2010 | Kottomtharayil et al. | |
| 7,814,074 B2 | 10/2010 | Anglin et al. | |
| 7,814,149 B1* | 10/2010 | Stringham | G06F 16/1748 709/203 |
| 7,822,939 B1 | 10/2010 | Veprinsky et al. | |
| 7,827,150 B1 | 11/2010 | Wu et al. | |
| 7,831,795 B2 | 11/2010 | Prahlad et al. | |
| 7,840,533 B2 | 11/2010 | Prahlad et al. | |
| 7,899,871 B1* | 3/2011 | Kumar | G06Q 10/107 709/206 |
| 7,962,452 B2 | 6/2011 | Anglin et al. | |
| 8,041,907 B1* | 10/2011 | Wu | G06F 11/1453 711/161 |
| 8,074,043 B1 | 12/2011 | Zeis | |
| 8,095,756 B1 | 1/2012 | Somavarapu | |
| 8,108,446 B1* | 1/2012 | Christiaens | G06F 16/1748 707/816 |
| 8,108,638 B2 | 1/2012 | Kishi | |
| 8,131,669 B2* | 3/2012 | Cannon | H04L 67/1095 707/609 |
| 8,145,614 B1 | 3/2012 | Zimran et al. | |
| 8,156,086 B2 | 4/2012 | Lu et al. | |
| 8,170,995 B2 | 5/2012 | Prahlad et al. | |
| 8,199,911 B1 | 6/2012 | Tsaur et al. | |
| 8,200,638 B1 | 6/2012 | Zheng et al. | |
| 8,200,923 B1 | 6/2012 | Healey et al. | |
| 8,204,862 B1 | 6/2012 | Paulzagade et al. | |
| 8,209,334 B1 | 6/2012 | Doerner | |
| 8,224,875 B1 | 7/2012 | Christiaens et al. | |
| 8,229,954 B2 | 7/2012 | Kottomtharayil et al. | |
| 8,230,195 B2 | 7/2012 | Amarendran et al. | |
| 8,261,240 B2 | 9/2012 | Hoban | |
| 8,280,854 B1 | 10/2012 | Emmert | |
| 8,285,681 B2 | 10/2012 | Prahlad et al. | |
| 8,307,177 B2 | 11/2012 | Prahlad et al. | |
| 8,352,422 B2 | 1/2013 | Prahlad et al. | |
| 8,364,652 B2 | 1/2013 | Vijayan et al. | |
| 8,370,315 B1 | 2/2013 | Efstathopoulos et al. | |
| 8,370,542 B2 | 2/2013 | Lu et al. | |

(56) References Cited

U.S. PATENT DOCUMENTS

| | | |
|---|---|---|
| 8,375,008 B1 * | 2/2013 | Gomes .................. G06F 16/10 707/694 |
| 8,375,181 B1 | 2/2013 | Kekre et al. |
| 8,407,190 B2 | 3/2013 | Prahlad et al. |
| 8,468,320 B1 | 6/2013 | Stringham |
| 8,479,304 B1 | 7/2013 | Clifford |
| 8,484,162 B2 | 7/2013 | Prahlad et al. |
| 8,510,573 B2 | 8/2013 | Muller et al. |
| 8,527,469 B2 * | 9/2013 | Hwang ............... G06F 16/2255 707/673 |
| 8,549,350 B1 | 10/2013 | Dutch et al. |
| 8,572,055 B1 * | 10/2013 | Wu .................... G06F 11/1453 707/697 |
| 8,572,340 B2 | 10/2013 | Vijayan et al. |
| 8,577,851 B2 | 11/2013 | Vijayan et al. |
| 8,578,109 B2 | 11/2013 | Vijayan et al. |
| 8,578,120 B2 | 11/2013 | Attarde et al. |
| 8,595,191 B2 | 11/2013 | Prahlad et al. |
| 8,621,240 B1 | 12/2013 | Auchmoody et al. |
| 8,645,320 B2 | 2/2014 | Prahlad et al. |
| 8,719,264 B2 | 5/2014 | Varadharajan |
| 8,725,688 B2 | 5/2014 | Lad |
| 8,726,242 B2 | 5/2014 | Ngo |
| 8,745,105 B2 | 6/2014 | Erofeev |
| 8,775,823 B2 | 7/2014 | Gokhale et al. |
| 8,825,720 B1 | 9/2014 | Xie et al. |
| 8,849,762 B2 | 9/2014 | Kumarasarny et al. |
| 8,909,980 B1 | 12/2014 | Lewis et al. |
| 8,930,306 B1 | 1/2015 | Ngo et al. |
| 8,938,481 B2 | 1/2015 | Kumarasamy et al. |
| 8,954,446 B2 | 2/2015 | Vijayan et al. |
| 9,015,181 B2 | 4/2015 | Kottomtharayil et al. |
| 9,020,900 B2 | 4/2015 | Vijayan et al. |
| 9,092,441 B1 | 7/2015 | Patiejunas et al. |
| 9,098,495 B2 | 8/2015 | Gokhale |
| 9,104,623 B2 | 8/2015 | Vijayan et al. |
| 9,110,602 B2 | 8/2015 | Vijayan et al. |
| 9,116,850 B2 | 8/2015 | Vijayan et al. |
| 9,128,901 B1 | 9/2015 | Nickurak |
| 9,171,008 B2 | 10/2015 | Prahlad et al. |
| 9,208,160 B2 | 12/2015 | Prahlad et al. |
| 9,218,374 B2 | 12/2015 | Muller et al. |
| 9,218,375 B2 | 12/2015 | Muller et al. |
| 9,218,376 B2 | 12/2015 | Muller et al. |
| 9,239,687 B2 | 1/2016 | Vijayan et al. |
| 9,244,779 B2 | 1/2016 | Littlefield et al. |
| 9,251,186 B2 | 2/2016 | Muller et al. |
| 9,298,386 B2 | 3/2016 | Baldwin et al. |
| 9,298,715 B2 | 3/2016 | Kumarasamy et al. |
| 9,298,724 B1 | 3/2016 | Patil et al. |
| 9,323,820 B1 | 4/2016 | Lauinger et al. |
| 9,336,076 B2 | 5/2016 | Baldwin et al. |
| 9,342,537 B2 | 5/2016 | Kumarasamy et al. |
| 9,405,631 B2 | 8/2016 | Prahlad et al. |
| 9,405,763 B2 | 8/2016 | Prahlad et al. |
| 9,442,806 B1 | 9/2016 | Bardale |
| 9,483,486 B1 * | 11/2016 | Christiaens ......... G06F 16/1748 |
| 9,575,673 B2 | 2/2017 | Mitkar et al. |
| 9,619,480 B2 | 4/2017 | Vijayan et al. |
| 9,633,033 B2 | 4/2017 | Vijayan et al. |
| 9,633,056 B2 | 4/2017 | Attarde et al. |
| 9,639,289 B2 | 5/2017 | Vijayan et al. |
| 9,665,591 B2 | 5/2017 | Vijayan et al. |
| 9,678,968 B1 | 6/2017 | Taylor et al. |
| 9,858,156 B2 | 1/2018 | Muller et al. |
| 9,898,225 B2 | 2/2018 | Vijayan et al. |
| 9,898,478 B2 | 2/2018 | Vijayan et al. |
| 9,934,238 B2 | 4/2018 | Mitkar et al. |
| 9,990,253 B1 | 6/2018 | Rajimwale et al. |
| 10,061,663 B2 | 8/2018 | Vijayan et al. |
| 10,126,973 B2 | 11/2018 | Vijayan et al. |
| 10,176,053 B2 | 1/2019 | Muller et al. |
| 10,191,816 B2 | 1/2019 | Vijayan et al. |
| 10,229,133 B2 | 3/2019 | Vijayan et al. |
| 10,255,143 B2 | 4/2019 | Vijayan et al. |
| 10,310,953 B2 | 6/2019 | Vijayan et al. |
| 10,339,106 B2 | 7/2019 | Vijayan et al. |
| 10,380,072 B2 | 8/2019 | Attarde et al. |
| 10,387,269 B2 | 8/2019 | Muller et al. |
| 10,445,293 B2 | 10/2019 | Attarde et al. |
| 10,474,638 B2 | 11/2019 | Mitkar et al. |
| 10,481,824 B2 | 11/2019 | Vijayan et al. |
| 10,481,825 B2 | 11/2019 | Vijayan et al. |
| 10,481,826 B2 | 11/2019 | Vijayan et al. |
| 10,540,327 B2 | 1/2020 | Ngo et al. |
| 10,592,357 B2 | 3/2020 | Vijayan et al. |
| 10,740,295 B2 | 8/2020 | Vijayan et al. |
| 2001/0052015 A1 | 12/2001 | Lin et al. |
| 2002/0062439 A1 | 5/2002 | Cotugno et al. |
| 2002/0065892 A1 * | 5/2002 | Malik .................. G06Q 10/107 709/206 |
| 2002/0083055 A1 | 6/2002 | Pachet |
| 2002/0107877 A1 | 8/2002 | Whiting et al. |
| 2002/0133601 A1 | 9/2002 | Kennamer et al. |
| 2002/0143892 A1 | 10/2002 | Mogul |
| 2002/0144250 A1 | 10/2002 | Yen |
| 2002/0169934 A1 | 11/2002 | Krapp et al. |
| 2003/0033308 A1 | 2/2003 | Patel et al. |
| 2003/0084076 A1 | 5/2003 | Sekiguchi et al. |
| 2003/0105716 A1 * | 6/2003 | Sutton, Jr. ............. H04L 9/3247 705/50 |
| 2003/0115346 A1 | 6/2003 | McHenry et al. |
| 2003/0149750 A1 | 8/2003 | Franzenburg |
| 2003/0172130 A1 | 9/2003 | Fruchtman et al. |
| 2003/0174648 A1 | 9/2003 | Wang et al. |
| 2003/0182310 A1 * | 9/2003 | Charnock ............. G06Q 10/10 |
| 2003/0187917 A1 | 10/2003 | Cohen |
| 2003/0188106 A1 | 10/2003 | Cohen |
| 2004/0010562 A1 | 1/2004 | Itonaga |
| 2004/0128442 A1 | 7/2004 | Hinshaw et al. |
| 2004/0148306 A1 | 7/2004 | Moulton et al. |
| 2004/0181519 A1 | 9/2004 | Anwar |
| 2004/0215746 A1 | 10/2004 | McCanne et al. |
| 2004/0230753 A1 | 11/2004 | Amiri et al. |
| 2005/0033756 A1 | 2/2005 | Kottomtharayil et al. |
| 2005/0060643 A1 * | 3/2005 | Glass .................... G06F 40/169 715/205 |
| 2005/0066118 A1 | 3/2005 | Perry |
| 2005/0066225 A1 | 3/2005 | Rowan |
| 2005/0108292 A1 | 5/2005 | Burton |
| 2005/0114450 A1 * | 5/2005 | DeVos .................... H04L 51/08 709/206 |
| 2005/0117558 A1 | 6/2005 | Angermann et al. |
| 2005/0144202 A1 | 6/2005 | Chen |
| 2005/0204108 A1 | 9/2005 | Ofek et al. |
| 2005/0216659 A1 | 9/2005 | Ogawa et al. |
| 2005/0243609 A1 | 11/2005 | Yang et al. |
| 2005/0246393 A1 | 11/2005 | Coates et al. |
| 2005/0268068 A1 | 12/2005 | Ignatius et al. |
| 2005/0273654 A1 | 12/2005 | Chen et al. |
| 2006/0004808 A1 | 1/2006 | Hsu et al. |
| 2006/0005048 A1 | 1/2006 | Osaki |
| 2006/0010227 A1 * | 1/2006 | Atluri .................. H04L 67/1097 709/217 |
| 2006/0020660 A1 | 1/2006 | Prasad et al. |
| 2006/0064456 A1 | 3/2006 | Kalthoff et al. |
| 2006/0074957 A1 | 4/2006 | Yamamoto et al. |
| 2006/0089954 A1 * | 4/2006 | Anschutz ............. G06F 11/1453 |
| 2006/0095257 A1 | 5/2006 | Malik |
| 2006/0101096 A1 | 5/2006 | Fuerst |
| 2006/0129537 A1 | 6/2006 | Torii |
| 2006/0136685 A1 | 6/2006 | Griv |
| 2006/0167900 A1 | 7/2006 | Pingte et al. |
| 2006/0168318 A1 | 7/2006 | Twiss |
| 2006/0179261 A1 | 8/2006 | Twiss |
| 2006/0179405 A1 | 8/2006 | Chao et al. |
| 2006/0224846 A1 | 10/2006 | Amarendran et al. |
| 2006/0277154 A1 * | 12/2006 | Lunt .................... G06F 16/313 |
| 2007/0006018 A1 | 1/2007 | Thompson |
| 2007/0038714 A1 * | 2/2007 | Sell ..................... H04L 51/34 709/206 |
| 2007/0043757 A1 * | 2/2007 | Benton ............... G06F 16/137 |
| 2007/0050526 A1 | 3/2007 | Abe et al. |
| 2007/0067263 A1 | 3/2007 | Syed |

(56) References Cited

U.S. PATENT DOCUMENTS

| | | |
|---|---|---|
| 2007/0073814 A1 | 3/2007 | Kamat et al. |
| 2007/0156966 A1 | 7/2007 | Sundarrajan et al. |
| 2007/0162462 A1 | 7/2007 | Zhang et al. |
| 2007/0179990 A1 | 8/2007 | Zimran et al. |
| 2007/0179995 A1 | 8/2007 | Prahlad et al. |
| 2007/0192444 A1 | 8/2007 | Ackaouy et al. |
| 2007/0192542 A1 | 8/2007 | Frolund et al. |
| 2007/0192544 A1 | 8/2007 | Frolund et al. |
| 2007/0203937 A1 | 8/2007 | Prahlad et al. |
| 2007/0250670 A1 | 10/2007 | Fineberg et al. |
| 2007/0255758 A1 | 11/2007 | Zheng et al. |
| 2008/0005141 A1 | 1/2008 | Zheng et al. |
| 2008/0005509 A1 | 1/2008 | Smith et al. |
| 2008/0016131 A1* | 1/2008 | Sandorfi ............ G06F 11/1458 |
| 2008/0028149 A1 | 1/2008 | Pardikar et al. |
| 2008/0089342 A1 | 4/2008 | Lansing et al. |
| 2008/0091655 A1 | 4/2008 | Gokhale et al. |
| 2008/0091725 A1 | 4/2008 | Hwang et al. |
| 2008/0098041 A1 | 4/2008 | Chidambaran et al. |
| 2008/0098083 A1* | 4/2008 | Shergill ............ G06F 11/1453 |
| | | 709/217 |
| 2008/0133561 A1 | 6/2008 | Dubnicki et al. |
| 2008/0140630 A1 | 6/2008 | Sato et al. |
| 2008/0159331 A1 | 7/2008 | Mace et al. |
| 2008/0229037 A1* | 9/2008 | Bunte ............ G06F 16/113 |
| | | 711/162 |
| 2008/0243769 A1* | 10/2008 | Arbour ............ G06F 11/1453 |
| 2008/0243879 A1 | 10/2008 | Gokhale et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244172 A1 | 10/2008 | Kano |
| 2008/0244199 A1 | 10/2008 | Nakamura et al. |
| 2008/0244204 A1* | 10/2008 | Cremelie ............ G06F 11/2097 |
| | | 711/162 |
| 2008/0244205 A1 | 10/2008 | Amano |
| 2008/0250204 A1 | 10/2008 | Kavuri et al. |
| 2008/0256326 A1* | 10/2008 | Patterson ............ G06F 3/0604 |
| | | 711/206 |
| 2008/0256431 A1 | 10/2008 | Hornberger |
| 2008/0281908 A1 | 11/2008 | McCanne et al. |
| 2008/0294660 A1 | 11/2008 | Patterson et al. |
| 2008/0294696 A1 | 11/2008 | Frandzel |
| 2008/0313236 A1 | 12/2008 | Vijayakumar et al. |
| 2008/0320151 A1 | 12/2008 | McCanne et al. |
| 2009/0013129 A1 | 1/2009 | Bondurant |
| 2009/0013258 A1 | 1/2009 | Hintermeister et al. |
| 2009/0043767 A1 | 2/2009 | Joshi et al. |
| 2009/0055425 A1 | 2/2009 | Evans et al. |
| 2009/0055471 A1 | 2/2009 | Kozat et al. |
| 2009/0077140 A1 | 3/2009 | Anglin et al. |
| 2009/0138481 A1 | 5/2009 | Chatley et al. |
| 2009/0144416 A1 | 6/2009 | Chatley et al. |
| 2009/0144422 A1 | 6/2009 | Chatley et al. |
| 2009/0171888 A1* | 7/2009 | Anglin ............ G06F 16/113 |
| 2009/0172139 A1 | 7/2009 | Wong et al. |
| 2009/0182789 A1* | 7/2009 | Sandorfi ............ G06F 11/1004 |
| 2009/0183162 A1 | 7/2009 | Kindel et al. |
| 2009/0204636 A1 | 8/2009 | Li et al. |
| 2009/0204649 A1 | 8/2009 | Wong et al. |
| 2009/0210431 A1 | 8/2009 | Marinkovic et al. |
| 2009/0228599 A1* | 9/2009 | Anglin ............ G06F 11/1453 |
| | | 709/231 |
| 2009/0243846 A1 | 10/2009 | Yuuki |
| 2009/0254507 A1 | 10/2009 | Hosoya et al. |
| 2009/0268903 A1 | 10/2009 | Bojinov et al. |
| 2009/0271454 A1 | 10/2009 | Anglin et al. |
| 2009/0276454 A1 | 11/2009 | Smith |
| 2009/0307251 A1 | 12/2009 | Heller et al. |
| 2009/0319534 A1 | 12/2009 | Gokhale |
| 2009/0319585 A1 | 12/2009 | Gokhale |
| 2009/0327625 A1 | 12/2009 | Jaquette et al. |
| 2010/0005259 A1 | 1/2010 | Prahlad |
| 2010/0011178 A1 | 1/2010 | Feathergill |
| 2010/0031086 A1 | 2/2010 | Leppard |
| 2010/0036887 A1 | 2/2010 | Anglin et al. |
| 2010/0042790 A1 | 2/2010 | Mondal et al. |
| 2010/0049926 A1 | 2/2010 | Fuente et al. |
| 2010/0049927 A1 | 2/2010 | Fuente et al. |
| 2010/0070478 A1 | 3/2010 | Anglin |
| 2010/0077161 A1* | 3/2010 | Stoakes ............ G06F 11/1453 |
| | | 711/162 |
| 2010/0082558 A1 | 4/2010 | Anglin et al. |
| 2010/0082672 A1 | 4/2010 | Kottomtharayil et al. |
| 2010/0088296 A1 | 4/2010 | Periyagaram et al. |
| 2010/0094817 A1 | 4/2010 | Ben-Shaul et al. |
| 2010/0100529 A1 | 4/2010 | Erofeev |
| 2010/0114833 A1 | 5/2010 | Mu |
| 2010/0153511 A1* | 6/2010 | Lin .................... H04L 51/10 |
| | | 709/207 |
| 2010/0169287 A1 | 7/2010 | Klose |
| 2010/0180075 A1 | 7/2010 | McCloskey et al. |
| 2010/0198864 A1* | 8/2010 | Ravid ............... G06K 9/00483 |
| | | 707/769 |
| 2010/0223495 A1 | 9/2010 | Leppard |
| 2010/0250501 A1 | 9/2010 | Mandagere et al. |
| 2010/0250549 A1 | 9/2010 | Muller et al. |
| 2010/0250896 A1 | 9/2010 | Matze |
| 2010/0257142 A1 | 10/2010 | Murphy et al. |
| 2010/0257346 A1 | 10/2010 | Sosnosky et al. |
| 2010/0257403 A1 | 10/2010 | Virk et al. |
| 2010/0306283 A1 | 12/2010 | Johnson et al. |
| 2010/0312752 A1 | 12/2010 | Zeis et al. |
| 2010/0318759 A1 | 12/2010 | Hamilton et al. |
| 2010/0332401 A1 | 12/2010 | Prahlad et al. |
| 2010/0332454 A1 | 12/2010 | Prahlad et al. |
| 2011/0010498 A1 | 1/2011 | Lay et al. |
| 2011/0060940 A1 | 3/2011 | Taylor et al. |
| 2011/0072291 A1 | 3/2011 | Murase |
| 2011/0113012 A1 | 5/2011 | Gruhl et al. |
| 2011/0113013 A1 | 5/2011 | Reddy et al. |
| 2011/0113016 A1 | 5/2011 | Gruhl et al. |
| 2011/0119741 A1 | 5/2011 | Kelly et al. |
| 2011/0153570 A1 | 6/2011 | Kim et al. |
| 2011/0161723 A1 | 6/2011 | Taleck et al. |
| 2011/0167221 A1 | 7/2011 | Pangal et al. |
| 2011/0258161 A1 | 10/2011 | Constantinescu et al. |
| 2011/0276543 A1 | 11/2011 | Matze |
| 2011/0289281 A1 | 11/2011 | Spackman |
| 2011/0302140 A1 | 12/2011 | Gokhale et al. |
| 2011/0314070 A1 | 12/2011 | Brown et al. |
| 2011/0314400 A1 | 12/2011 | Mital et al. |
| 2012/0011101 A1 | 1/2012 | Fang et al. |
| 2012/0016839 A1 | 1/2012 | Yueh |
| 2012/0016845 A1 | 1/2012 | Bates |
| 2012/0078881 A1 | 3/2012 | Crump et al. |
| 2012/0084272 A1 | 4/2012 | Garces-Erice et al. |
| 2012/0089574 A1 | 4/2012 | Doerner |
| 2012/0150818 A1 | 6/2012 | Vijayan et al. |
| 2012/0166403 A1 | 6/2012 | Kim et al. |
| 2012/0185437 A1 | 7/2012 | Pavlov et al. |
| 2012/0221817 A1 | 8/2012 | Yueh |
| 2012/0233417 A1 | 9/2012 | Kalach |
| 2012/0303622 A1 | 11/2012 | Dean et al. |
| 2013/0006943 A1 | 1/2013 | Chavda et al. |
| 2013/0219470 A1 | 8/2013 | Chintala et al. |
| 2013/0238562 A1 | 9/2013 | Kumarasamy et al. |
| 2013/0238572 A1 | 9/2013 | Prahlad et al. |
| 2013/0262396 A1 | 10/2013 | Kripalani et al. |
| 2013/0339298 A1 | 12/2013 | Muller et al. |
| 2013/0339310 A1 | 12/2013 | Muller et al. |
| 2014/0032940 A1 | 1/2014 | Sartirana et al. |
| 2014/0115287 A1 | 4/2014 | Schnapp et al. |
| 2014/0181028 A1 | 6/2014 | Prahlad et al. |
| 2014/0195749 A1 | 7/2014 | Colgrove et al. |
| 2014/0196037 A1 | 7/2014 | Gopalan et al. |
| 2014/0201142 A1 | 7/2014 | Varadharajan et al. |
| 2014/0201150 A1 | 7/2014 | Kumarasamy et al. |
| 2014/0201153 A1 | 7/2014 | Vijayan et al. |
| 2014/0229451 A1 | 8/2014 | Venkatesh et al. |
| 2014/0250076 A1 | 9/2014 | Lad |
| 2014/0258245 A1 | 9/2014 | Estes |

(56) References Cited

U.S. PATENT DOCUMENTS

| | | |
|---|---|---|
| 2014/0281758 A1 | 9/2014 | Klein et al. |
| 2014/0289225 A1 | 9/2014 | Chan et al. |
| 2014/0337285 A1 | 11/2014 | Gokhale et al. |
| 2014/0337664 A1 | 11/2014 | Gokhale et al. |
| 2015/0012698 A1 | 1/2015 | Bolla et al. |
| 2015/0088821 A1 | 3/2015 | Blea et al. |
| 2015/0089185 A1 | 3/2015 | Brandyberry et al. |
| 2015/0134611 A1 | 5/2015 | Avati et al. |
| 2015/0154220 A1 | 6/2015 | Ngo et al. |
| 2015/0161015 A1 | 6/2015 | Kumarasamy et al. |
| 2015/0212893 A1 | 7/2015 | Pawar et al. |
| 2015/0212894 A1 | 7/2015 | Pawar et al. |
| 2015/0212895 A1 | 7/2015 | Pawar et al. |
| 2015/0212896 A1 | 7/2015 | Pawar et al. |
| 2015/0212897 A1 | 7/2015 | Pawar et al. |
| 2015/0248466 A1 | 9/2015 | Jernigan, IV et al. |
| 2015/0261776 A1 | 9/2015 | Attarde et al. |
| 2015/0269032 A1 | 9/2015 | Muthyala et al. |
| 2015/0269212 A1 | 9/2015 | Kramer et al. |
| 2015/0278104 A1 | 10/2015 | Moon et al. |
| 2015/0347306 A1 | 12/2015 | Gschwind |
| 2015/0378839 A1 | 12/2015 | Langouev et al. |
| 2016/0026405 A1 | 1/2016 | Dhuse |
| 2016/0041880 A1 | 2/2016 | Mitkar et al. |
| 2016/0042090 A1 | 2/2016 | Mitkar et al. |
| 2016/0062846 A1 | 3/2016 | Nallathambi et al. |
| 2016/0065671 A1 | 3/2016 | Nallathambi et al. |
| 2016/0139836 A1 | 5/2016 | Nallathambi et al. |
| 2016/0142483 A1 | 5/2016 | Nallathambi et al. |
| 2016/0154709 A1 | 6/2016 | Mitkar et al. |
| 2016/0170657 A1 | 6/2016 | Suehr et al. |
| 2016/0188416 A1 | 6/2016 | Muller et al. |
| 2016/0196070 A1 | 7/2016 | Vijayan et al. |
| 2016/0266980 A1 | 9/2016 | Muller et al. |
| 2016/0299818 A1 | 10/2016 | Vijayan et al. |
| 2016/0306707 A1 | 10/2016 | Vijayan et al. |
| 2016/0306708 A1 | 10/2016 | Prahlad et al. |
| 2016/0306818 A1 | 10/2016 | Vijayan et al. |
| 2016/0350391 A1 | 12/2016 | Vijayan et al. |
| 2017/0031768 A1 | 2/2017 | Sarab |
| 2017/0083558 A1 | 3/2017 | Vijayan et al. |
| 2017/0083563 A1 | 3/2017 | Vijayan et al. |
| 2017/0090773 A1 | 3/2017 | Vijayan et al. |
| 2017/0090786 A1 | 3/2017 | Parab et al. |
| 2017/0168903 A1 | 5/2017 | Dornemann et al. |
| 2017/0192860 A1 | 7/2017 | Vijayan et al. |
| 2017/0192861 A1 | 7/2017 | Vijayan et al. |
| 2017/0192866 A1 | 7/2017 | Vijayan et al. |
| 2017/0192868 A1 | 7/2017 | Vijayan et al. |
| 2017/0193003 A1 | 7/2017 | Vijayan et al. |
| 2017/0199699 A1 | 7/2017 | Vijayan et al. |
| 2017/0206219 A1 | 7/2017 | Vijayan et al. |
| 2017/0235647 A1 | 8/2017 | Kilaru et al. |
| 2017/0242871 A1 | 8/2017 | Kilaru et al. |
| 2017/0262217 A1 | 9/2017 | Pradhan et al. |
| 2017/0315876 A1 | 11/2017 | Dornquast et al. |
| 2018/0075055 A1 | 3/2018 | Ngo et al. |
| 2018/0189314 A1 | 7/2018 | Mitkar et al. |
| 2018/0196720 A1 | 7/2018 | Muller et al. |
| 2019/0179805 A1 | 6/2019 | Prahlad et al. |
| 2019/0188088 A1 | 6/2019 | Muller et al. |
| 2019/0205290 A1 | 7/2019 | Vijayan et al. |
| 2019/0227879 A1 | 7/2019 | Vijayan et al. |
| 2019/0272220 A1 | 9/2019 | Vijayan et al. |
| 2019/0272221 A1 | 9/2019 | Vijayan et al. |
| 2019/0310968 A1 | 10/2019 | Attarde et al. |
| 2020/0104052 A1 | 4/2020 | Vijayan et al. |
| 2020/0104213 A1 | 4/2020 | Muller et al. |
| 2020/0117641 A1 | 4/2020 | Mitkar et al. |
| 2020/0167091 A1 | 5/2020 | Haridas et al. |
| 2020/0167240 A1 | 5/2020 | Haridas et al. |
| 2020/0250145 A1 | 8/2020 | Ngo et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 1995/013580 | 5/1995 |
| WO | WO 99/009480 A1 | 2/1999 |
| WO | WO 1999/012098 | 3/1999 |
| WO | WO 2002/005466 | 1/2002 |
| WO | WO 2006/052872 | 5/2006 |
| WO | WO 2010/013292 A1 | 2/2010 |
| WO | WO 2010/140264 | 12/2010 |
| WO | WO 2012/044366 | 4/2012 |
| WO | WO 2012/044367 | 4/2012 |
| WO | WO 2013/188550 | 12/2013 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Ashton, et al., "Two Decades of policy-based storage management for the IBM mainframe computer", www.research.ibm.com, 19 pages, published Apr. 10, 2003, printed Jan. 3, 2009, www.research.ibm.com, Apr. 10, 2003, pp. 19.

Bhagwat, Extreme Binning: Scalable, Parallel Deduplication for Chunk-based File Backup. IEEE 2009, 9 pages.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Cohen, Edith, et al, "The Age Penalty and Its Effect on Cache Performance." In USITS, pp. 73-84. 2001.

Cohen, Edith, et al, "Aging through cascaded caches: Performance issues in the distribution of web content." In ACM Sigcomm Computer Communication Review, vol. 31, No. 4, pp. 41-53. ACM, 2001.

Cohen, Edith, et al,. "Refreshment policies for web content caches." Computer Networks 38.6 (2002): 795-808.

CommVault Systems, Inc. "Continuous Data Replicator 7.0," Product Data Sheet, 2007.

CommVault Systems, Inc., "Deduplication—How To," http://documentation.commvault.com/commvault/release_8_0_0/books_online_1/english_US/features/single_instance/single_instance_how_to.htm, internet accessed on Jan. 26, 2009, 7 pages.

CommVault Systems, Inc., "Deduplication," http://documentation.commvault.com/commvault/release_8_0_0/books_online_1/english_US/features/single_instance/single_instance.htm, internet accessed on Jan. 26, 2009, 9 pages.

Diligent Technologies HyperFactor, http://www.dilligent.com/products:protecTIER-1:HyperFactor-1, Internet accessed on Dec. 5, 2008, 2 pages.

Dubnicki, et al. "HYDRAstor: A Scalable Secondary Storage." FAST. vol. 9.2009, 74 pages.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Gray (#2 of 2, pp. 604-609), Jim; Reuter Andreas, Transaction Processing Concepts and Techniques, Morgan Kaufmann Publisher, USA 1994, pp. 604-609.

Guo et al., Building a High-performance Deduplication System, Jun. 15, 2011, retrieved from the Internet at <URL: http://dl.acm.org/citation.cfm?id=2002206>, pp. 1-14.

Huff, KL, "Data Set Usage Sequence Number," IBM Technical Disclosure Bulletin, vol. 24, No. 5, Oct. 1981 New York, US, pp. 2404-2406.

(56) References Cited

OTHER PUBLICATIONS

Jander, "Launching Storage-Area Net," Data Communications, US, McGraw Hill, NY, vol. 27, No. 4(Mar. 21, 1998), pp. 64-72.
Kashyap, et al., "Professional Services Automation: A knowledge Management approach using LSI and Domain specific Ontologies", FLAIRS-01 Proceedings, 2001, pp. 300-302.
Kornblum, Jesse, "Identifying Almost Identical Flies Using Context Triggered Piecewise Hashing," www.sciencedirect.com, Digital Investigation 3S (2006), pp. S91-S97.
Lortu Software Development, "Kondar Technology-Deduplication," http://www.lortu.com/en/deduplication.asp, Internet accessed on Dec. 5, 2008, 3 pages.
Overland Storage, "Data Deduplication," http://www.overlandstorage.com/topics/data_deduplication.html, Internet accessed on Dec. 5, 2008, 2 pages.
Quantum Corporation, "Data De-Duplication Background: A Technical White Paper," May 2008, 13 pages.
Rosenblum et al., "The Design and Implementation of a Log-Structure File System," Operating Systems Review SIGOPS, vol. 25, No. 5, New York, US, pp. 1-15 (May 1991).
Wei, et al. "MAD2: A scalable high-throughput exact deduplication approach for network backup services." Mass Storage Systems and Technologies (MSST), 2010 IEEE 26th Symposium on. IEEE, 2010, 14 pages.
Wolman et al., On the scale and performance of cooperative Web proxy caching, 1999.
Wu, et al., Load Balancing and Hot Spot Relief for Hash Routing among a Collection of Proxy Caches, 1999.
Final Office Action for Japanese Application No. 2003531581, Examiner Kudoh, dated Mar. 24, 2009, 6 pages.
International Search Report and Written Opinion, International Application No. PCT/US2009/58137, dated Dec. 23, 2009, 14 pages.
International Search Report and Written Opinion, International Application No. PCT/US2011/030804, dated Jun. 9, 2011.
International Search Report and Written Opinion, International Application No. PCT/US2011/030814, dated Jun. 9, 2011.
International Search Report and Written Opinion, International Application No, PCT/US2013/045443 dated Nov. 14, 2013, 16 pages.
International Preliminary Report on Patentability, International Application No. PCT/US2013/045443 dated Dec. 16, 2014 11 pages.

\* cited by examiner

DE-DUPLICATION SYSTEMS AND METHODS FOR APPLICATION-SPECIFIC DATA

RELATED APPLICATIONS

Any and all applications for which a foreign or domestic priority claim is identified in the Application Data Sheet, or any correction thereto, are hereby incorporated by reference into this application under 37 CFR 1.57.

BACKGROUND

Field

Embodiments of the invention relate to data management and, in particular, to systems and methods for reducing duplicate data in a computer system.

Description of the Related Art

With the increased reliance on computer systems to store critical information, the importance of protecting information has grown. As a result, certain storage systems receive an identification of a file to protect and then create one or more secondary copies, such as backup files, containing the contents of the file. These secondary copies can then later be used to restore the original data should anything happen to the original data.

In corporate environments, protecting information is generally part of a routine process that is performed for many computer systems within an organization. For example, a company might back up critical computing systems related to e-commerce such as databases, file servers, web servers, and so on as part of a daily, weekly, or monthly maintenance schedule. The company may also protect computing systems used by each of its employees, such as those used by an accounting department, marketing department, engineering department, and so forth.

Although each computer system contains certain unique information, many systems may contain very similar information. For example, although a computing system used by a marketing employee and a computing system used by an engineering employee will generally contain unique information created by each employee in the course of their work, both computing systems will likely have the same operating system installed, with thousands of identical or similar files used by the operating system. Similarly, both computing systems will likely have at least some similar application programs installed, such as a word processor, spreadsheet, Internet browser, and so on. Both systems may also have similar corporate information. For example, each employee may have an electronic copy of an employee manual distributed by the company. Information other than files may also be identical or similar between systems. For example, user settings and preferences may have similar default values on each system and application programs may contain similar templates on each system that are stored as application-specific information. As another example, several employees may have received a copy of the same email, and the email may be stored in each employee's electronic mailbox.

As a result of the amount of redundant information in an organization, secondary copies of an organization's information are often very large and can require the purchase of expensive storage devices and storage media. The restoration of data in the event of data loss is also slowed by the large size of the secondary copies. As the size of secondary copies increases, locating and restoring information requires more actions to be taken. For example, it may be necessary to search many tapes or other media to find the correct secondary copy. The great quantity of storage media, such as tapes, may mean that some secondary storage media has been moved offsite requiring that it first be retrieved before information can be recovered from it. Each of these factors increases the cost of protecting information and the time required to recover information in the event of data loss. Quick recovery of information is often critical to today's businesses, and any additional delay can affect business operations and customers' satisfaction with the business.

SUMMARY

Single instancing in a data management system is the process of attempting to store only a single instance of a file or data object. Certain objects are often stored in large, monolithic files that are intended to be read only by the application that created them. For example, a MICROSOFT EXCHANGE email server stores email messages in one or more large data files that typically hold thousands of different users' mailboxes. As another example, a database server often stores tables, forms, reports, and other data objects in one or two large data files that provide persistence for the entire database.

Thus, typical data management systems are only able to perform data management operations on the large data file, rather than the data objects themselves. In the case of the email server, a given electronic mail application may generate multiple email messages that all differ, but which all contain the same attachment. Prior systems may not be able to differentiate these messages, and thus each would be stored with the attachment. Further, if two files had different properties or metadata, such prior systems would store both files, even though the data they contain are identical and differ only by their metadata.

In view of the foregoing, certain embodiments of the invention include a de-duplication system for managing application-generated data objects. The system comprises a first backup agent executing on a first client device and a de-duplication module executing on a computing device. The first backup agent is configured to, in response to a storage operation request: parse first application-specific data of the first client device that is the subject of the storage operation request, the first application-specific data comprising a plurality of first data objects having different sizes; identify, based at least on an application that generated the first application-specific data, one or more of the plurality of first data objects of the first application-specific data to be considered for de-duplication, wherein the one of more first data objects comprises less than the entire first application-specific data; and insert at least one indicator in the first application-specific data that identifies at least one location of the one or more first data objects within the first application-specific data. The de-duplication module is in communication with the first backup agent to receive the first application-specific data and is configured to: process each of the one or more data objects; and, based on said processing, determine if a duplicate copy of any of the one or more first data objects exists in a storage device.

In certain embodiments, a method is disclosed for managing application-generated data objects. The method comprises receiving a first storage operation request for first data generated by a first application executing on a first client device, the first data comprising a plurality of first data objects having non-uniform sizes. The method further comprises parsing the first data to identify one or more of the plurality of first data objects to be considered for de-duplication. The method also includes inserting at least one indicator in the first data that identifies at least one location of the one or more first data objects within the first data and processing each of the one or more first data objects to determine if a duplicate copy of the one or more first data objects exists in at least one storage device. For each of the one or more first data objects, if a duplicate copy does not exist in the storage device, the method stores the first data object in the at least one storage device. Otherwise, a stub file and/or a pointer is stored in place of the first data object in the storage device.

In certain embodiments, a method is disclosed for managing application-generated data objects. The method includes receiving a first storage operation request for first data generated by a first application executing on a first client device, the first data comprising a plurality of first data objects. The method also includes parsing the first data to identify one or more of the first data objects to be considered for de-duplication and receiving a second storage operation request for second data generated by a second application, the second data comprising a plurality of second data objects, and the second data having a different file format than the first data. The method further includes parsing the second data to identify one or more of the plurality of second data objects to be considered for de-duplication. In addition, the method includes inserting in the first data and/or the second data an indicator that denotes, based on the first and second file formats, that the one or more first data objects should not be single instanced with the one or more second data objects.

In certain embodiments, a system is disclosed for managing application-generated data objects. The system includes means for receiving a first storage operation request for first data generated by a first application executing on a first client device, the first data comprising a plurality of first data objects having differing sizes. The system also includes means for parsing the first data to identify one or more of the first data objects to be considered for de-duplication, wherein the one of more first data objects comprises less than the entire first data; means for inserting at least one indicator in the first data that identifies at least one location of the one or more first data objects within the first data; and means for processing each of the one or more first data objects to determine if a duplicate copy of the first data object exists in at least one storage device. In addition, the system includes means for (i) storing each of the one or more first data objects in the storage device that does not have a duplicate copy and (ii) storing a stub and/or a pointer in place of each of the one or more first data objects that does have a duplicate copy in the at least one storage device.

In certain embodiments, a method is disclosed for managing data in a computer system. The method comprises accessing first data, the first data comprising at least one first data object in a first file format, and accessing second data, the second data comprising at least one second data object in a second file format, the second file format being different than the first file format. The method further comprises inserting in at least one of a copy of the first data and a copy of the second data an indicator that denotes that, based on the first and second file formats, the at least one first data object cannot or should not be single instanced with the at least one second data object.

In certain embodiments, the method is performed by one or more content-aware data agents residing on one or more client devices. Such agents can advantageously identify portions of data to be backed up, archived or otherwise stored to be considered for possible de-duplication.

In certain embodiments, a de-duplication system is disclosed for managing application-generated data objects. The system comprises a first backup agent executing on a first client device, the first backup agent being configured to, in response to a storage operation request: (i) parse first application-specific data of the first client device that is the subject of the storage operation request, (ii) identify one or more first data objects of the first application-specific data to be considered for de-duplication, and (iii) insert an indicator in a copy of the application-specific data that identifies the one or more first data objects to be considered for de-duplication.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Figure 1:
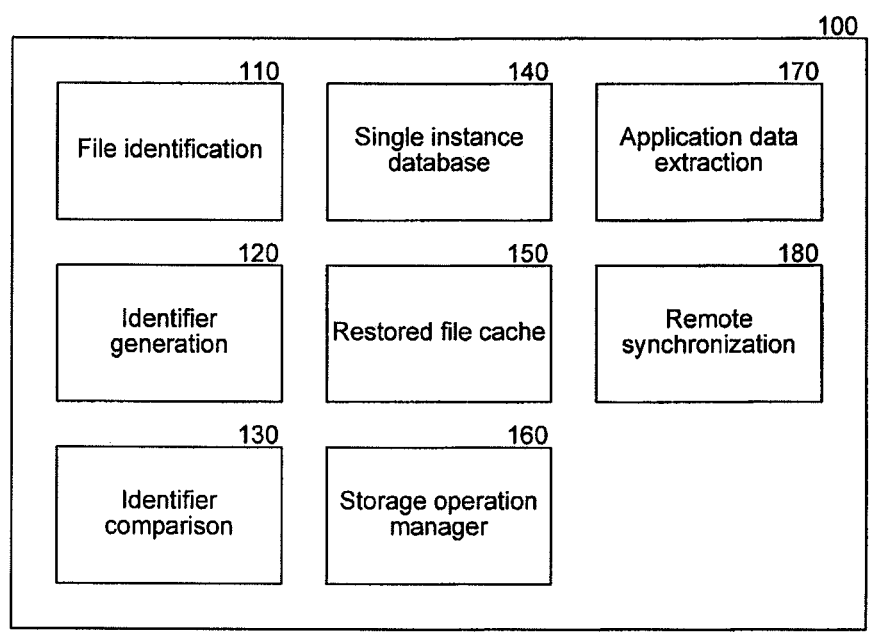
FIG. 1 is a block diagram that illustrates components of a single instancing system in accordance with one embodiment of the invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 604 is first introduced and discussed with respect to FIG. 6).

DETAILED DESCRIPTION OF CERTAIN EMBODIMENTS

The headings provided herein are for convenience only and do not necessarily affect the scope or meaning of the claimed invention.

Overview

Described in detail herein are single instancing systems that more intelligently identify multiple copies of the same data object. For example, certain embodiments of the single instancing system recognize documents, files, or data objects produced by multiple different applications, and can parse through and identify those data objects common among data blocks within a file, and thereby only copy a single instance of those common data objects. Further embodiments parse the proprietary data formats of many applications and can identify data objects related to the application, even when those data objects are stored in large, monolithic data files. In addition, if two documents, files, or data objects are substantially similar, but have differing metadata, such as different user permissions, embodiments of the single instancing system can store a single instance of the data object, but retain all differing versions of the metadata (for example, such as by retaining the different user permissions). When a client requests the data object, the single instancing system returns appropriate metadata based on the identity of the client or other information.

According to other embodiments of the single instancing system, if multiple clients and associated media agents are in remote locations, the single instancing system may perform backup of data to a local, single instance database or data store at each remote location. Then, the single instancing system may use continuous data replication (CDR) to copy the data contained in each local data store to a central location.

In further embodiments, content-aware systems and methods are disclosed for improving de-duplication/single instancing in storage operations. In certain examples, backup agents on client devices parse application-specific data to identify data objects that are likely candidates for de-duplication. The backup agents can then insert markers or other indictors in the data that identify the location(s) of the particular data objects. Such markers can, in turn, assist a de-duplication manager to perform object-based de-duplication and increase the likelihood that like blocks are identified within the data. In other examples, the agents can further determine if a data object of one file type can, or should, be single-instanced with a data object of a different file type. Such processing of data on the client side can provide for more efficient storage and back-end processing in a data storage system.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Unless described otherwise below, embodiments of the invention may be practiced with various data processing systems. Thus, the construction and operation of the various blocks shown in FIG. 1 need not be described in further detail herein to make and use the invention, because such blocks will be understood by those skilled in the relevant art. One skilled in the relevant art can readily make any modifications necessary to the blocks in FIG. 1 (or other embodiments or figures) based on the detailed description provided herein.

FIG. 1 is a block diagram that illustrates components of a single instancing system 100, in one embodiment. The single instancing system 100 contains a file identification component 110, an identifier generation component 120, an identifier comparison component 130, a single instance database component 140, a restored file cache component 150, a storage operation manager component 160, an application data extraction component 170, and a remote synchronization component 180.

The file identification component 110 identifies files or data objects, such as in response to a storage operation. As used herein, the terms "file" or "data object" are broad terms and are used in their ordinary sense and include, without limitation, any collection or grouping of bytes of data that can be viewed as one or more logical units. For example, a file could be a computer file on a file system (for example, a word processing file, a spreadsheet file, a database file, etc.) As another example, a data object could be a file or within a file (e.g., an embedded object within a word processing file, a cell or a row in a spreadsheet file, a table or an entry in a table in a database file, a string, an array, or any other collection of electronic information). Moreover, data objects need not be limited to units of the same size but can comprise, in certain embodiments, multiple objects of differing sizes. The file identification component 110 may retrieve additional information related to a file or data object, such as its size, that is used by the single instancing system 100 to uniquely identify the data object.

When the file identification component 110 identifies a file, the application data extraction component 170 determines whether the file contains additional data objects. For example, the file may be an application-specific container (for example, a database file), that stores data objects such as documents, email messages, and other collections of data. The application data extraction component 170 would determine that each of the data objects within the application-specific container should be identified.

The identifier generation component 120 generates a substantially unique identifier of a file or data object that is used to determine if another file or data object already stored by the single instancing system matches the file or data object used to generate the substantially unique identifier. The identifier comparison component 130 performs comparisons of identifiers of various files or data objects to determine if the files or data objects contain similar data (for example, the identifier comparison component 130 can compare substantially unique identifiers of two or more files or data objects to determine if the files or data objects contain similar data).

The single instance database component 140 is a data store that contains entries identifying files or data objects managed by the single instancing system 100, and may also contain supplemental information associated with files or data objects, such as a substantially unique identifier, a path, a location, a reference count, a file size or other information. The restored file cache component 150 provides an intermediate location that may be used by the single instancing system 100 during a restore operation to hold instances of files or data objects for which additional references may need to be restored.

For example, during a restore operation, the single instancing system may restore files or data objects to the cache and then transfer the files or data objects to a target location of the restore operation. When the single instancing system 100 encounters a reference to a single instance copy of a file or data object, the single instancing system 100 may consult the restored file cache component 150 or an index. The single instancing system 100 does so to determine if the file or data object is present in the cache before attempting to restore the file or data object from another location, such as from secondary storage (for example, a tape).

The storage operation manager component 160 coordinates storage operations and invokes the other components of the single instancing system 100 as needed to perform requested storage operations. For example, the storage operation manager component 160 may include an application used by an administrator to manage the single instancing system 100. The storage operation manager component 160 may also maintain indexes of the data objects and each of the references to those data objects through the single instancing system 100, as well as pending operations on the data objects that are part of a data management plan of an organization implementing the single instancing system 100.

The remote synchronization component 180 performs single instancing between a remote location and a central location, such as between an enterprise or organization having a headquarters or central office and one or more satellite offices or remote offices, or vice-versa. The remote synchronization component 180 uses the techniques described in further detail herein to determine whether a file or data object should be copied from the remote location to the central location.

FIG. 1 and the discussion herein provide a brief, general description of a suitable computing environment in which the invention can be implemented. Although not required, embodiments of the invention are described in the general context of computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer" are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Embodiments of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Embodiments of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under embodiments of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention may reside on a server computer, while corresponding portions reside on a client computer such as a mobile or portable device, and thus, while certain hardware platforms are described herein, embodiments of the invention are equally applicable to nodes on a network.

Single Instancing

Reducing or eliminating redundant instances of data resulting from a storage operation is sometimes referred to here as de-duplication or "single instancing," because what would traditionally be stored as many instances of the same data is reduced to as few as one. Redundant instances may be detected and reduced at several locations or times throughout the operation of the system that will now be described. These embodiments are provided only as examples, and are not intended to be an exhaustive list of the way in which the system can be implemented.

In some embodiments, the single instancing system performs single instancing of data at a computing system that contains or originally generated the data, such as a client computing system. For example, a client computing system that is providing data that is the target of a storage operation may receive a request from the single instancing system to provide a substantially unique identifier (for example, a hash value, message digest, checksum, digital fingerprint, digital signature or other sequence of bytes that substantially uniquely identifies the file or data object) of each file or data object included in the storage operation.

The word "substantially" is used to modify the term "unique identifier" because algorithms used to produce hash values may result in collisions, where two different files or data objects result in the same hash value. However, depending upon the algorithm or cryptographic hash function used, collisions should be suitably rare and thus the identifier generated for a file or data object should be unique throughout the single instancing system. As an alternative to the single instancing system generating the substantially unique identifier, the client computing system may itself generate substantially unique identifiers for each file or data object that is stored on the client computing system on an ongoing or other basis. When a storage operation is requested, the single instancing system determines if another file or data object exists with a substantially unique identifier matching that of the one provided by the client computing system. If the single instancing system is already aware of a similar file or data object, then the client computing system does not need to send the redundant file or data object to a secondary storage location or destination.

Rather than operating only at the file level, in some embodiments, the single instancing system may also operate at a lower level of granularity by enumerating data objects within files of understood types. For example, the single instancing system may read and parse data files from email servers (for example, MICROSOFT EXCHANGE email servers, Sendmail email servers, etc.), database servers (for example, MICROSOFT SQL Server database servers, ORACLE database servers, etc.), web servers (for example, MICROSOFT IIS web servers, APACHE web servers, etc.), word processing applications (for example, MICROSOFT WORD, COREL WORDPERFECT, etc.), spreadsheet applications (for example, MICROSOFT EXCEL, APPLE NUMBERS, etc.), and many others and enumerate the data objects within these files.

The single instancing system may then generate a substantially unique identifier for each data object within the file, rather than each file, and store this substantially unique identifier in the single instance database component 140 or other index. The single instancing system may also store information about the associations between the data objects and their containing files. Therefore, the single instancing system enables data storage operations such as searching, backing up, restoring, replicating, copying and so forth to be performed at the data object level. Enabling data storage operations at the data object level enables the single instancing system to store data using much less space than traditional single instancing storage systems, because files containing data objects are likely to have redundant data objects, of which only one instance or copy need be stored.

For example, the data of two email servers that each contain similar email messages in a large data file can be stored in much less space than if the entire data files of each email server were to be stored, because the data files are likely to contain redundant email messages, of which only one instance or copy need be stored. This is because traditional single instancing systems would determine that the two data files differed and would store both data files, thereby consuming more storage space.

Figure 2:
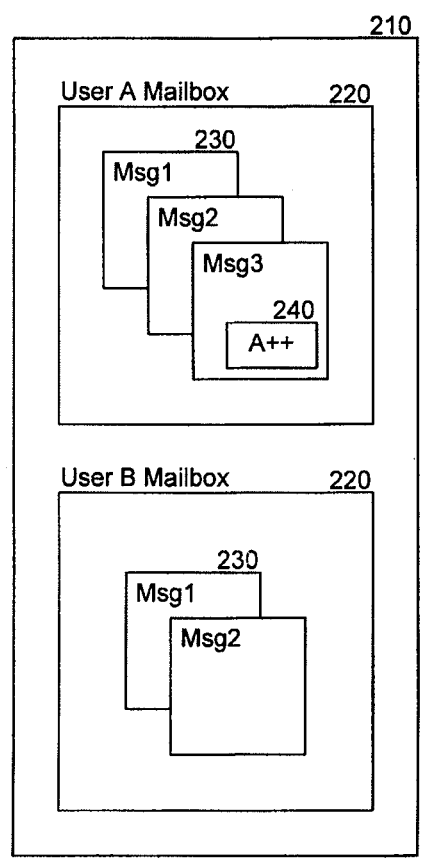
FIG. 2 is a block diagram that illustrates an example data file containing data objects.

FIG. 2 illustrates an example data file produced by an email server. The data file 210 holds containers 220 of data related to each user that has a mailbox on the email server. Each container 220 holds email messages 230 for a specific user, and each email message 230 may contain one or more attachments 240. Email messages are often forwarded to many users, and the users may be assigned to the same or different email servers. The single instancing system may know or understand the structure of the data file 210 before performing any single instancing operations, as discussed in more detail with respect to FIGS. 3B and 3C.

For example, the single instancing system may identify the type of the data file based on the data file's filename extension. The identified data file type may be used to identify a format or specification that describes the structure (e.g., at which bytes specific data is stored, its particular encoding, etc.) of the data file. This knowledge of the structure enables the application data extraction component 170 to parse the data file 210, identify containers 220, and extract email messages 230 or attachments 240 from each container 220. Alternatively, the data file 210 may contain metadata, a header or other information that describes its data structure.

The application data extraction component 170 can obtain this metadata or other information, which enables it to parse the data file 210, identify containers 220, and extract email messages 230 or attachments 240 from each container 220. The single instancing system can then store only a single instance or copy of the extracted email messages 230 or attachments 240 that are similar. By operating on the data at the data object level, the single instancing system provides substantial benefit by identifying the redundancy of data objects stored within the data files and providing single instancing of the individual data objects.

In some embodiments, the single instancing system or another system performs additional operations on the data after single instancing has occurred. For example, another system may encrypt backup data that is being stored offsite to prevent unauthorized parties from accessing the data. Another system may also compress the data to reduce its size. The single instancing system enables these additional operations to be performed more efficiently, because there is less data on which to perform these additional operations after redundant data has been reduced or eliminated.

Single Instanced Archive and Backup Data Using Single Storage Policy

One example of a single instancing system employs a single storage policy or data store. A storage policy is generally a virtual container with preferences that contains a set of rules for data retention of data objects associated with the storage policy. The single instancing system in this example stores single instance data in a single location and in a manner to ensure that any relevant, unique data is retained, but only a single instance of common data is copied to the data store. Notably, a single instancing agent creates, updates, or maintains a single instance database or index that represents or stores the substantially unique identifiers of each file or data object. The single instance database or index is associated with a single storage policy that is separate from one or more data stores that store the data copies. A single storage policy may represent a storage location that includes existing data, as well as new data that has been compared to the existing data and identified as being unique.

Figure 3A:
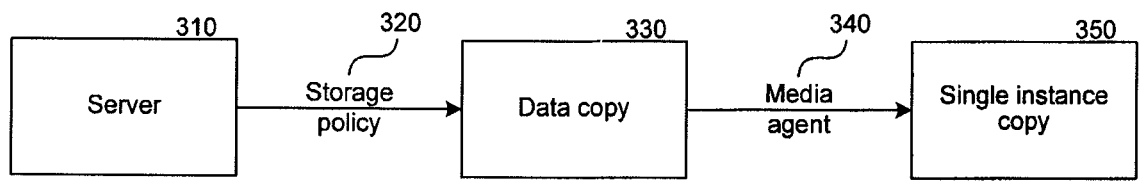
FIG. 3A is a block diagram that illustrates the flow of data during a storage operation, in one embodiment.

FIG. 3A is a block diagram that illustrates the flow of data during a storage operation, in one embodiment. Data is initially stored on a server 310 or other source of data. A storage policy 320 or other configuration information specifies a storage operation to be performed on the data. For example, the storage policy 320 may specify that the data stored on the server 310 is to be backed up daily to tape. The application of the storage policy 320 causes the backup to occur, resulting in the creation of the data copy 330. The data copy 330 may contain many redundant files or other data objects.

A media agent 340 manages the data copy 330, and creates a single instance copy 350. The single instance copy 350 is a copy in which at least some of the redundant files or data objects have been removed. The media agent 340 uses the methods described herein to eliminate redundant instances of files or data objects contained in the data copy 330, and to produce the single instance copy 350. The single instance copy 350 may then be stored on tape or other media.

The single instancing system may employ one or more specialized single instancing agents. For example, as described below, the single instancing system may employ application agents associated with types of applications, metadata agents for analyzing metadata, encryption/compression agents, and so forth. Alternatively, a single agent employing all of the functions described herein may be employed. These agents operate on all types of data, including documents, files, data objects, or any data blocks.

An application agent associated with each type of application may analyze incoming or previously stored data to identify redundant data. For example, an email agent analyzes incoming or previously stored emails, including attachments to emails, to identify duplicate attachments. The email agent provides a first instance of an email with an attachment to the storage policy, but for subsequent emails having the same attachment, the email agent strips them of their attachments and stores them with a stub or pointer to the previously stored attachment.

A metadata agent analyzes files or data objects for similarities in data, but differences in metadata that is associated with the files or data objects. For example, two files may have the same data, but separate permissions, properties, access control lists (ACLs), operating system metadata (e.g., UNIX and WINDOWS metadata), application-specific metadata, ownership metadata, anti-virus information, security metadata, other metadata, combinations of the same or the like. The metadata agent ascertains that the two files contain the same data but have differing metadata, and thus stores only one instance of the file, but two or more instances of the associated metadata, as well as information about the associations between the metadata, the providers of the files and the files. Such embodiments of the invention can advantageously allow for single instancing, or de-duplication, of files or data objects across different operating systems.

When a client requests the file, the single instancing system provides the file to the client with the appropriate instance of the metadata based on the identity of the requestor. For example, a data file may be stored on a user computer with permissions restricting access to the data file to the user of that computer, and the same data file may be stored on a second computer with permissions restricting access to the data file to an administrator of the single instancing system. The user will still be able to access the data file from the single instance store even though the user is not an administrator of the single instancing system. This is because the single instancing system will use the metadata from the file from the user's computer to ascertain that the user has the permissions needed to access the file, and permit the requested access to the user.

As another example, two files may have the same data, but different properties, such as the creation date or access date. The metadata agent ascertains that the two files contain the same content but have different properties. The metadata agent thus stores only one instance of the file, but two or more instances of the properties, as well as information about the associations between the metadata, the providers of the files and the files. Because an association between the provider of the file and the file is stored, when a client requests the file, the single instancing system can provide the file with the proper metadata to the client.

In yet other embodiments, one or more agents on one or more client devices can perform one or more functions of the above-described metadata agent. Embodiments of agents usable with embodiments of the invention are described in more detail below, with particular reference to FIGS. 3B and 3C.

The single instancing system can single instance both non-encrypted and encrypted data received from client computers. Each client computer may generate a substantially unique identifier for the file or data object before the file or data object is encrypted. The client computer does this before encryption because an encrypted file or data object would almost certainly result in a substantially unique identifier that is different from a substantially unique identifier generated from the file or data object before encryption. Alternatively, a client computer could generate a substantially unique identifier for a file or data object after the file or data object is encrypted. An encryption agent may compare the substantially unique identifiers to identify identical files or data objects, and thus only store one instance of them.

In some embodiments, the single instancing system determines whether to store an instance of an encrypted or unencrypted file (or data object, but file is used in this and the following paragraphs discussing encryption for brevity) based on whether the files are encrypted using the same encryption scheme, whether the encrypted files can be decrypted by the single instancing system, and/or other factors.

For example, consider the following three situations involving encrypted files: 1) where the single instancing system has previously stored an instance of a file that is encrypted and a request is made to store another instance of the file that is also encrypted; 2) where the single instancing system has previously stored an instance of a file that is unencrypted and a request is made to store another instance of the file that is encrypted; and 3) where the single instancing system has previously stored an instance of a file that is encrypted and a request is made to store another instance of the file that is unencrypted. Metadata associated with the file is typically not encrypted. Moreover, information about the encryption scheme (for example, what public key is used to encrypt the file) may be provided as metadata to the single instancing system.

For the first situation, if the two file instances are encrypted using the same encryption scheme (for example, using the same public key), the single instancing system can avoid storing the second instance of the file. If the two files are encrypted using different encryption schemes, the single instancing system stores the second instance of the file. This is because the single instancing system has to be able to provide the second instance of the file to the requestor when requested.

Alternatively, if both encryption schemes are known to the single instancing system (for example, using two different public keys of the single instancing system), the single instancing system can avoid storing the file. This is because the single instancing system can decrypt the first instance of the file and re-encrypt it using the encryption scheme used to encrypt the second instance of the file. However, this decryption and re-encryption may be too computationally expensive, depending upon various factors (for example, the time needed to decrypt and re-encrypt the file, the algorithm, etc.), and so the single instancing system may simply store the second instance of the file.

For the second situation, if the second instance of the file is encrypted using an encryption scheme that is known to the single instancing system (for example, using a public key of the single instancing system), the single instancing system can avoid storing the second instance of the file. This is because, when the provider of the second encrypted instance requests the file, the single instancing system can retrieve the first unencrypted instance, encrypt it using the known encryption scheme and provide it to the requestor. However, if such encryption is too computationally expensive, the single instancing system may simply store the second encrypted instance of the file. If the second instance of the file is encrypted using an encryption scheme that is not known to the single instancing system, the single instancing system stores the second instance of the file. This is because the single instancing system has to be able to provide the second encrypted instance of the file to the requestor when requested.

For the third situation, if the first instance of the file is encrypted in such a way that it can be decrypted by the single instancing system, the single instancing system can avoid storing the second unencrypted instance of the file. This is because, when the provider of the second unencrypted instance requests the file, the single instancing system can retrieve the first encrypted instance, decrypt it, and provide it to the requestor. However, if such decryption is too computationally expensive, the single instancing system may simply store the second unencrypted instance of the file. If the first instance of the file is encrypted in such a way that it cannot be decrypted by the single instancing system, the single instancing system stores the second unencrypted instance of the file. This is because the single instancing system has to be able to provide the second unencrypted instance of the file to the requestor.

The single instancing system may also handle compressed files. Each client computer may generate a substantially unique identifier for the file or data object before the file or data object is compressed. The client computer does this before compression because a compressed file or data object would almost certainly result in a substantially unique identifier that is different from a substantially unique identifier generated from the file or data object before compression. Alternatively, a client computer could generate a substantially unique identifier for a file or data object after the file or data object is compressed. A compression agent may compare the substantially unique identifiers to identify identical files or data objects, and thus only store one of them.

In some embodiments, the single instancing system determines whether to store an instance of a compressed or uncompressed file (or data object, but file is used in this and the following paragraphs discussing compression for brevity) based on whether the files are compressed using the same compression scheme, whether the compressed files can be decompressed by the single instancing system, and/or other factors.

For example, consider the following three situations involving compressed files: 1) where the single instancing system has previously stored an instance of a file that is compressed and a request is made to store another instance of the file that is also compressed; 2) where the single instancing system has previously stored an instance of a file that is uncompressed and a request is made to store another instance of the file that is compressed; and 3) where the single instancing system has previously stored an instance of a file that is compressed and a request is made to store another instance of the file that is uncompressed. Metadata associated with the file is typically not compressed. Moreover, information about the compression scheme (for example, what compression algorithm is used to compress the file) may be provided as metadata to the single instancing system.

For the first situation, if the two file instances are compressed using the same compression scheme (for example, using the same compression algorithm), the single instancing system can avoid storing the second instance of the file. Otherwise, the single instancing system stores the second instance of the file. However, if the second instance of the file is compressed using a different compression scheme, the single instancing system may avoid storing the second instance of the file, if the single instancing system is able to decompress the first instance of the file and recompress the first instance of the file using the different compression scheme. If the single instancing system is not able to do so, the single instancing system stores the second instance of the file. However, this decompress and recompression may be too computationally expensive, depending upon various factors (for example, the time needed to decompress and recompress the file, the algorithm, etc.), and so the single instancing system may simply store the second instance of the file.

For the second situation, if the second instance of the file is compressed using a compression scheme that is known to the single instancing system (for example, using a known compression algorithm), the single instancing system can avoid storing the second instance of the file. This is because, when the provider of the second compressed instance requests the file, the single instancing system can retrieve the first uncompressed instance, compress it using the known compression scheme and provide it to the requestor. However, if such compression is too computationally expensive, the single instancing system may simply store the second compressed instance of the file. If the second instance of the file is compressed using a compression scheme that is not known to the single instancing system, the single instancing system stores the second instance of the file. This is because the single instancing system has to be able to provide the second compressed instance of the file to the requestor when requested.

For the third situation, if the first instance of the file is compressed in such a way that it can be decompressed by the single instancing system, the single instancing system can avoid storing the second uncompressed instance of the file. This is because, when the provider of the second uncompressed instance requests the file, the single instancing system can retrieve the first compressed instance, decompress it, and provide it to the requestor. However, if such decompression is too computationally expensive, the single instancing system may simply store the second uncompressed instance of the file. If the first instance of the file is compressed in such that it cannot be decompressed by the single instancing system, the single instancing system stores the second uncompressed instance of the file. This is because the single instancing system has to be able to provide the second uncompressed instance of the file to the requestor.

The single instancing system may be configurable to reduce processing time, transmission bandwidth, and the like with small files. For example, an administrator-configurable value would allow the administrator to configure the single instancing system to ignore files or data objects below a given size. For example, any file or data object below a certain threshold (for example, one kilobyte) may simply be stored, and a substantially unique identifier would not determined for it. Any file or data object greater than the threshold (for example, one kilobyte) would then be single instanced. An administrator may adjust this threshold up or down. As another example, the single instancing system may allow the administrator to configure it to always single instance files or data objects of a certain type or category (for example, executable files or modules may always be single instanced if they rarely change).

Alternatively, embodiments of the single instancing system may allow the administrator to never single instance files or data objects of a certain type or category (for example, log files may never be single instanced, because they typically change quite frequently) or compare data objects of certain different data formats.

In yet other embodiments, the single instancing system can comprise multiple single instancing, or de-duplication, components (e.g., databases) for processing and/or storing single instance copies 350 of data from different applications and/or file formats. For example, in certain embodiments, a file when processed (e.g., checked in) by a SHAREPOINT application can be fundamentally altered such that it differs from the same file when processed in an EXCHANGE server environment.

In view of the foregoing, certain embodiments of the single instancing system can determine that files or data objects from these two applications should not be considered together for single instancing since the copies of the same file will contain different data. Rather, the single instancing system can comprise different components that are each dedicated to single instance processing of the data from the two applications. For example, in certain embodiments, a first single instance database can allocated for SHAREPOINT data, while a second single instance database can be allocated for EXCHANGE data.

Moreover, the same single instancing system components can be dedicated for single instancing data of different applications that process data in a similar manner. For instance, in certain embodiments, the second single instance database described above could be allocated for both EXCHANGE and file system data, while the first single instance database is reserved for SHAREPOINT data.

In such embodiments, storage space can be advantageously allocated on one or more storage devices based on the expected amount of single instanced, or de-duplicated, data from the different applications. For example, a main or primary de-duplication database (e.g., having media with a faster access time) can be set aside for de-duplication of files or data objects from one or more applications or application formats producing a relatively large amount of data within a system, while a secondary de-duplication database can be reserved for data of one or more applications or application formats producing a relatively small amount of data in the system.

In certain embodiments, as discussed below with reference to FIGS. 3B and 3C, agents operating on one or more client devices can be used for identifying such application data that should or should not be considered together for possible de-duplication. Such identification could be performed, for example, when processing the client data to be sent to be backed up, archived or otherwise stored in secondary storage.

The single instancing system may further associate timestamps with the files or data objects or with their generated substantially unique identifiers. A timestamp may indicate the time at which the file or data object was created, last accessed or modified, or the time at which the single instancing system generated the substantially unique identifier for it, or the time at which the file or data object was stored by the single instancing system. The single instancing system may do so to determine whether a file or data object is substantially newer than another file or data object already stored in the single instancing system.

For example, two files or data objects may have the same substantially unique identifier, meaning that they contain the same data. The single instancing system may compare the timestamp of the first, previously stored, file or data object with that of the second file or data object. If the timestamp of the second file or data object is substantially newer than the timestamp of the first file or data object, the single instancing system may nonetheless store the second file or data object, even though it is duplicative of a file or data object that is already stored.

In this context, substantially newer means that the age (as determined by its timestamp) of the second file or data object is less than the age of the first, previously stored, file or data object by a certain amount or more (configurable by an administrator). The single instancing system could then prune off older versions as the data ages and is migrated to other storage, such as longer-term storage. For example, a first file or data object could have a timestamp indicating that its age is ten months. A second file or data object could have a timestamp indicating that its age is three months. If the administrator has configured the amount to be six months, then the second file or data object is substantially newer than the first file or data object, because the age of the second file or data object is less than the age of the first file or data object by more than the configured amount. Therefore, the single instancing system would store the second file or data object, and the first file or data object could be migrated to longer-term storage, such as to tape.

The single instancing system may be employed in any variety of architectures. For example, it may be employed with heterogeneous storage hardware, and thus is not reliant on a specific hardware platform to perform all of the single instancing functions. Instead, multiple, different data storage platforms may be employed for storing data under the storage policies. Further, the architecture may be tiered or federated wherein one server manages multiple cells (and each of those cells in turn may manage lower tier cells). In some embodiments, the cells may be arranged in hierarchies or organized in configurations such as those described in U.S. patent application Ser. No. 12/060,186, filed Mar. 31, 2008, published as U.S. Patent Application Publication No. 2008-0250204 A1, the entirety of which is hereby incorporated herein by reference.

The single instancing system may employ many other functions. For example, it may employ content indexing agents to index the content all data blocks. These content indexes may then be searched to permit users to readily locate desired data objects. Further details regarding content indexing may be found in U.S. patent application Ser. No. 11/694,869, filed Mar. 30, 2007, published as U.S. Patent Application Publication No. 2008-0091655 A1, the entirety of which is hereby incorporated herein by reference.

Figure 3B:
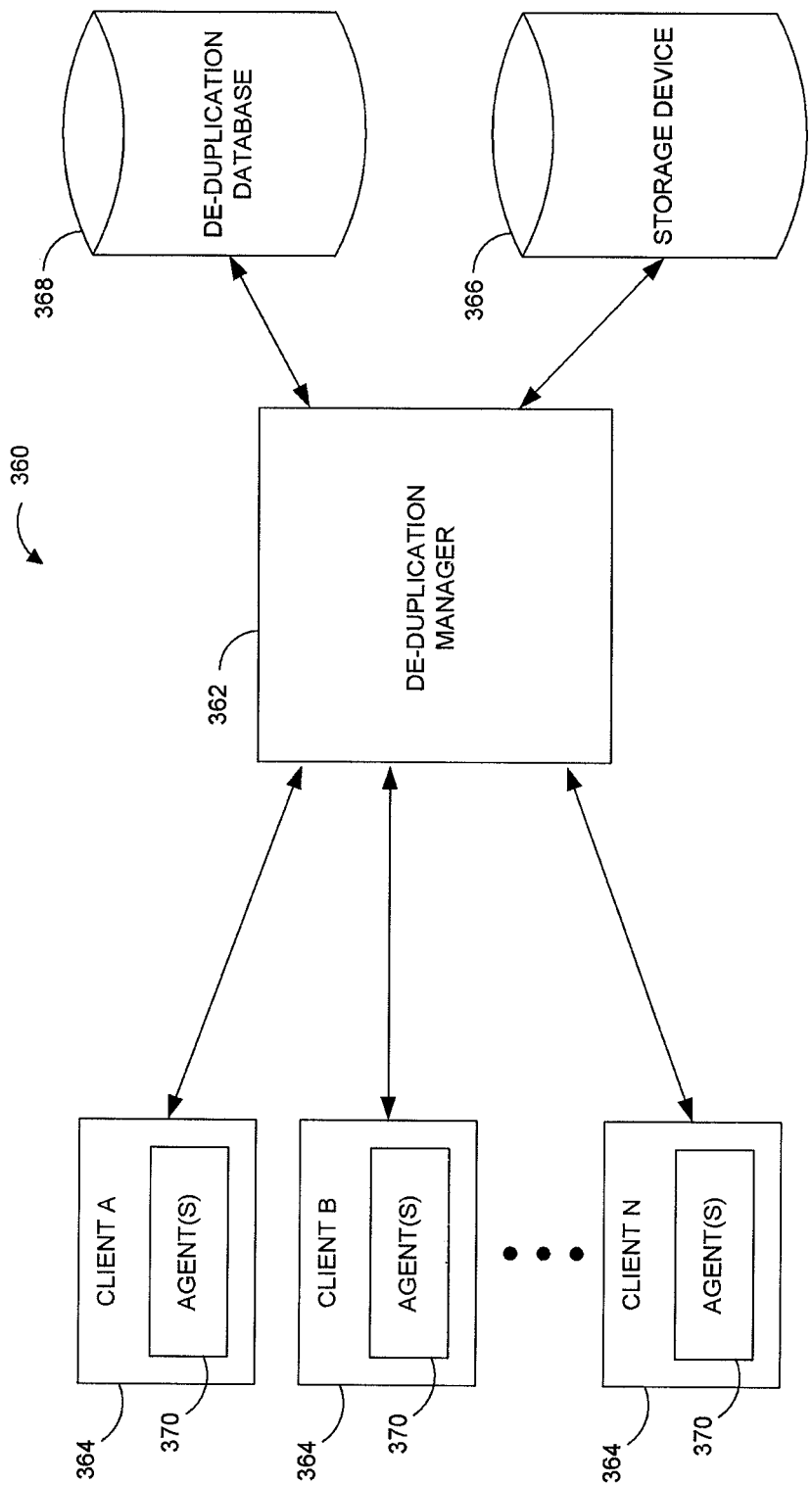
FIG. 3B is a block diagram that illustrates components of a content-aware de-duplication system in accordance with certain embodiments of the invention.

FIG. 3B is a block diagram that illustrates components of a content-aware de-duplication, or single-instancing, system 360, according to certain embodiments of the invention. In general, the de-duplication system 360, in certain embodiments, advantageously utilizes knowledge of file content to improve the de-duplication process by identifying the location(s) of files or data objects, such as data blocks, that are eligible and/or should be considered together for de-duplication.

In certain embodiments, the de-duplication system 360 provides an end-to-end, block-based and/or file-based de-duplication system that can extend across multiple tiers of secondary storage (including disk and tape) and/or encompass reduction of stored data across multiple backups, archives, clients and/or platforms. Embodiments of the de-duplication system 360 further employ application-aware or content-aware de-duplication processes to more accurately find and reduce common patterns in data across disparate applications, operating systems, file systems and/or data types.

As illustrated, the content-aware de-duplication system 360 comprises a de-duplication manager 362 that performs de-duplication of data received from one or more client devices 364. In certain embodiments, the de-duplication manager 362 can comprise the single instancing system 100, or one or more components thereof. For example, the de-duplication manager 362 can receive secondary copies (e.g., backup, migration and/or archive copies) of data from the client devices 364 and store at least portions of the secondary copies on the storage device 366.

A de-duplication database 368 can utilize one or more tables or other data structures to store substantially unique identifiers of data objects (e.g., files, blocks) that have already been stored on the storage device 366. If a copy or instance of a data object received by the de-duplication manager 362 has already been stored on the storage device 366, the de-duplication database 368 can be used to avoid sending an additional copy of the same data to the storage device 366. Examples of similar single instancing configurations and methods usable with embodiments of the invention are further disclosed in U.S. Provisional Patent Application No. 61/100,686, filed Sep. 26, 2008, which is hereby incorporated herein by reference in its entirety.

As further illustrated by FIG. 3B, each of the clients 364 comprises one or more agents 370 operating thereon, or associated therewith, for performing data and/or storage tasks related to the corresponding client 364. In certain embodiments, the agents 370 are data agents configured to generate secondary copies of data stored on, or accessible by, the corresponding client 364 for storage on the storage device 366. For instance, in certain embodiments, the agents 370 can advantageously be configured to translate or convert data on the client devices 364 into a particular backup format for facilitating de-duplication by the de-duplication manager 362.

In certain further embodiments, the agents 370 comprise application-specific, or content-aware, modules that are configured to access and process one or more particular data formats and/or data associated with a particular application. In certain embodiments, the agents 370 are advantageously used to process data within a database file, blob data and/or data encapsulated in another data format. For instance, each agent 370 can be aware of the various files, folders, registry files and/or system resources that are impacted by a particular application. In certain embodiments, different individual agents 370 may be designed to handle MICROSOFT EXCHANGE data, SQL SERVER data, LOTUS NOTES data, MICROSOFT WINDOWS 2000 file system data, SHAREPOINT data, and other types of data.

In certain embodiments, multiple agents 370 may be treated as separate agents even though they reside on the same client 364. In other embodiments, the separate agents may be combined to form a virtual agent for performing storage operations related to a specific application. Also, although the agents 370 are illustrated as executing on the client devices 364, it will be understood that embodiments of the agents 370 can also be configured to remotely access data stored on the client devices 364 through one or more application programming interfaces (APIs), remote procedure calls (RPCs) or the like.

In certain embodiments, the agent 370 is configured to perform data management or storage operations in accordance with one or more storage policies or other preferences. The storage polices and/or preferences may include, but are not limited to, information regarding storage locations, relationships between system components, network pathways, retention policies, data characteristics, compression or encryption requirements, preferred system components, combinations of the same or the like.

In certain embodiments, each agent 370 can prepare the secondary copy of the data to facilitate subsequent de-duplication of data objects within the backup data. Such embodiments can advantageously improve the speed of de-duplication since the de-duplication preparation can be integrated with the normal backup process and since the agents 370 can use knowledge of both specific file formats of the client data and the de-duplication process occurring on the back end of the de-duplication system 360.

In certain embodiments, the agent 370 identifies the locations of data objects within a file that should be considered for de-duplication. For instance, the agent 370 can indicate (e.g., via offsets) where the de-duplication manager 362 should start and/or stop considering data for possible de-duplication.

For instance, suppose the agent 370 is instructed to process the data file 210 (see FIG. 2), which was generated by an email server, to be backed up. In certain embodiments, because the agent 370 is familiar with the data format and structure of the data file 210, which contains multiple email messages 230 and attachments 240 in multiple user mailboxes 220, the agent 370 can identify to the de-duplication manager 362 where to begin within the data file 210 the de-duplication evaluation process.

For example, the agent 370 may insert one or more markers within the data file 210 that identify location(s) where a data object (e.g., the body of an email message, an attachment) begins and/or ends. In certain embodiments, such identification information can be advantageously used by the de-duplication manager 362 to more quickly identify portions of one or more data files that may be more likely to contain duplicate data (e.g., attachments between multiple email messages). In certain embodiments, the marker can further identify the type of data associated with the data object.

In embodiments of the invention that utilize block-level de-duplication, the information inserted by the agent 370 can advantageously assist the de-duplication manager 362 to know where to begin the de-duplication comparison of data such that a higher likelihood of detecting duplicate data is achieved. For instance, the agent 370 can process metadata and/or other file information regarding a particular data file to detect where logical or natural divisions within the file should be identified (e.g., an offset of a mail data file at which an attachment begins). As a result, it is more likely that like blocks are detected since the de-duplication manager 362 can proceed with its comparison and analysis of data blocks in corresponding locations of the data.

For example, suppose two different email messages to be backed up contain the same data object as an attachment, but the bodies of the email messages differ in size. If a block-level de-duplication manager 362 begins its comparison process at the beginning of each email message by comparing set de-duplication block sizes (e.g., 32 KB), the de-duplication manager 362 may not detect a match of the attachments of the two email messages since the attachments may be located at different offsets within the respective email messages (e.g., 40 KB and 46 KB).

However, using the identifying information generated by the agents 370, the de-duplication manager 362 can be instructed to begin the block-level comparison at the respective offsets within the two email messages whereat the particular attachments begin. As a result, such embodiments can advantageously increase the likelihood that duplicate data will be detected between data of like files (e.g., generated from the same application).

Although the agent 370 has been described as processing particular types of data (e.g., mail data), it will be understood that other embodiments of the invention can be used with a variety of different types of data and that different agents 370 can be associated with the different types of data to identify possible common duplicate data therein. For instance, a first agent can be used to identify data objects within an EXCHANGE server data file, while a second agent can be used to identify data objects within file system data such that the de-duplication manager 362 can more easily detect duplicate data objects between the two types of data.

In yet other embodiments, the agent 370 can generate substantially unique identifiers, as discussed above with respect to FIG. 1, for one or more files or data objects to be backed up.

Figure 3C:
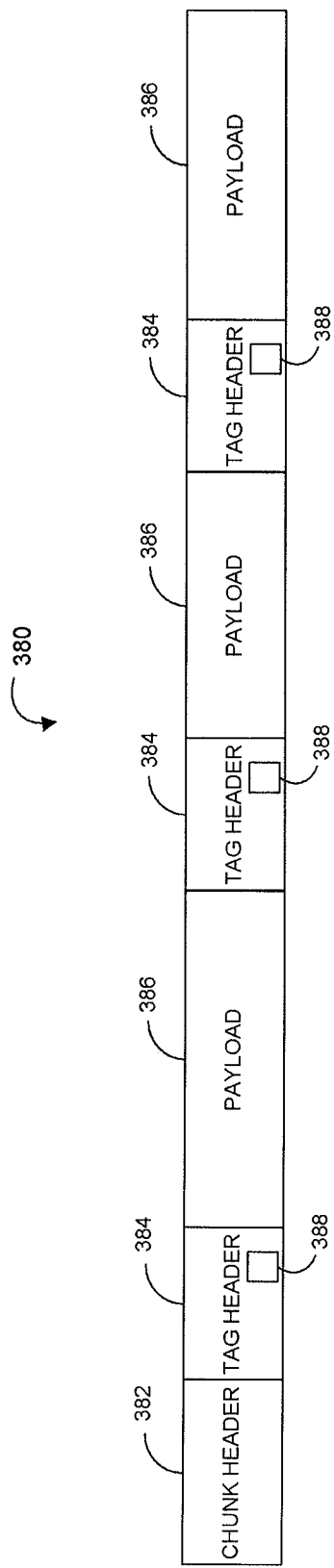
FIG. 3C illustrates exemplary fields of a chunk file usable with the de-duplication system of FIG. 3B in accordance with certain embodiments of the invention.

FIG. 3C illustrates exemplary fields of a chunk file 380 usable with the de-duplication/single instancing systems disclosed herein. In particular, the chunk file 380 can be used for transmitting client data to be backed up or archived on one or more storage devices. Moreover, the chunk file 380 can advantageously comprise one or more file markers or other information added by one or more content-aware agents 370 that identify data to be considered for possible de-duplication. For exemplary purposes, the chunk file 380 will be described with reference to the components of the de-duplication system 360 of FIG. 3B.

The chunk file 380 includes a chunk header 382 comprising metadata regarding the chunk file 380. The chunk file 380 further comprises a plurality of tag headers 384 that are each associated with a data payload 386 containing the actual data to be backed up. In certain embodiments, each tag header 384 comprises metadata (e.g., size, data type, or the like) regarding the data in the corresponding payload section 386.

As shown, each of the tag headers 384 comprises a de-duplication identifier 388. In certain embodiments, the identifier 388 indicates whether or not one or more data objects within the corresponding payload 386 should be considered for de-duplication. For instance, in certain embodiments, the identifier 388 comprises a single bit that indicates whether or not the de-duplication manager 362 should consider the data of the corresponding payload 386 for de-duplication.

In yet other embodiments, the identifier 388 can comprise a file marker or other data structure that demarcates payload data for possible de-duplication. For instance, the identifier 388 may identify particular offsets within the payload 386 whereat the de-duplication manager 362 should start and/or stop considering data objects for de-duplication. In certain embodiments, the identifier 388 can comprise a tag, a pointer, an index or table entry, a flag, a bit, a header, combinations of the same or the like.

In yet other embodiments, the identifier 388 can identify data objects that can or cannot be single instanced with other data objects (e.g., based on file types). In such embodiments, identifiers 388 may indicate that data of a particular payload 386 should be considered for de-duplication with reference to a first de-duplication database, while data of a second payload 386 should be considered for de-duplication with reference to a second de-duplication database.

In certain embodiments, the agent 370 inserts the identifier 388 in the chunk file 380. In certain embodiments, one or more agents 370 can also separate data of different applications and/or formats that should not be considered together for single instancing into separate payloads (e.g., under different tag headers) or separate chunk files.

Although FIG. 3C and the accompanying disclosure refer to chunk files for transmitting data, other embodiments of the invention can utilize different means or methods for transmitting data in which data therein is selectively identified for possible de-duplication. For instance, the agents 370 can be configured to insert similar file markers, bits and/or other data structures in a data stream being sent to the de-duplication manager 362 or other de-duplication reader/listener for consideration for de-duplication. In yet other embodiments, the described chunk file 380 can be used in archiving, migration, and/or other data storage methods that generate secondary copies of data.

Determining Data Object Similarity

Various methods of determining if one file or data object is similar (e.g., two instances of the same data) to another file or data object will now be described. However, those of ordinary skill in the art will recognize that many other methods besides those described herein may be used to achieve similar results.

In some embodiments, the single instancing system determines if two files or data objects are similar by performing a binary comparison. For example, a first file or data object can be compared byte by byte with a second file or data object, or portions of the first file or data object can be compared with portions of the second file or data object. If each byte of the compared data in each file or data object matches, then the two files or data objects are identical and therefore similar. Otherwise, the two files or data objects do not match and are not treated as similar.

In some embodiments, the single instancing system determines if two files or data objects are similar by creating a digest or fingerprint of the data contained in each file or data object. For example, as storage operations are performed, the single instancing system may perform a cryptographic hash on each file or data object to create a digest of the file or data object. The single instancing system compares the digest of the file or data object with stored digests created for other files or data objects. If the digests of two files or data objects match, then the single instancing system may consider the files or data objects to be identical. The single instancing system can use any suitable hashing algorithm, such as SHA512. For applications that create data files having embedded data objects, the single instancing system identifies the embedded data objects, and determines the similarity of each data object with other data objects found either within the same data file or in other data files or stores managed by the single instancing system.

Figure 4:
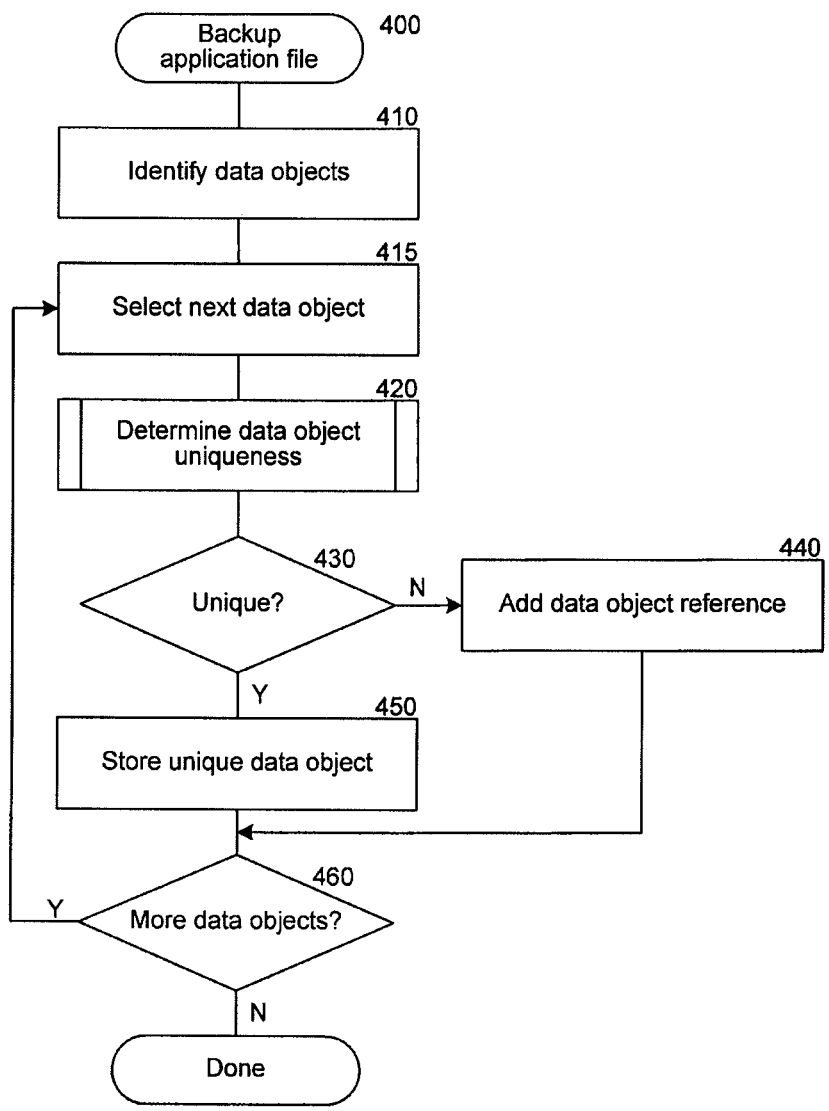
FIG. 4 is a flow diagram that illustrates processing of a storage operation manager component of the single instancing system, in one embodiment.
Figure 5:
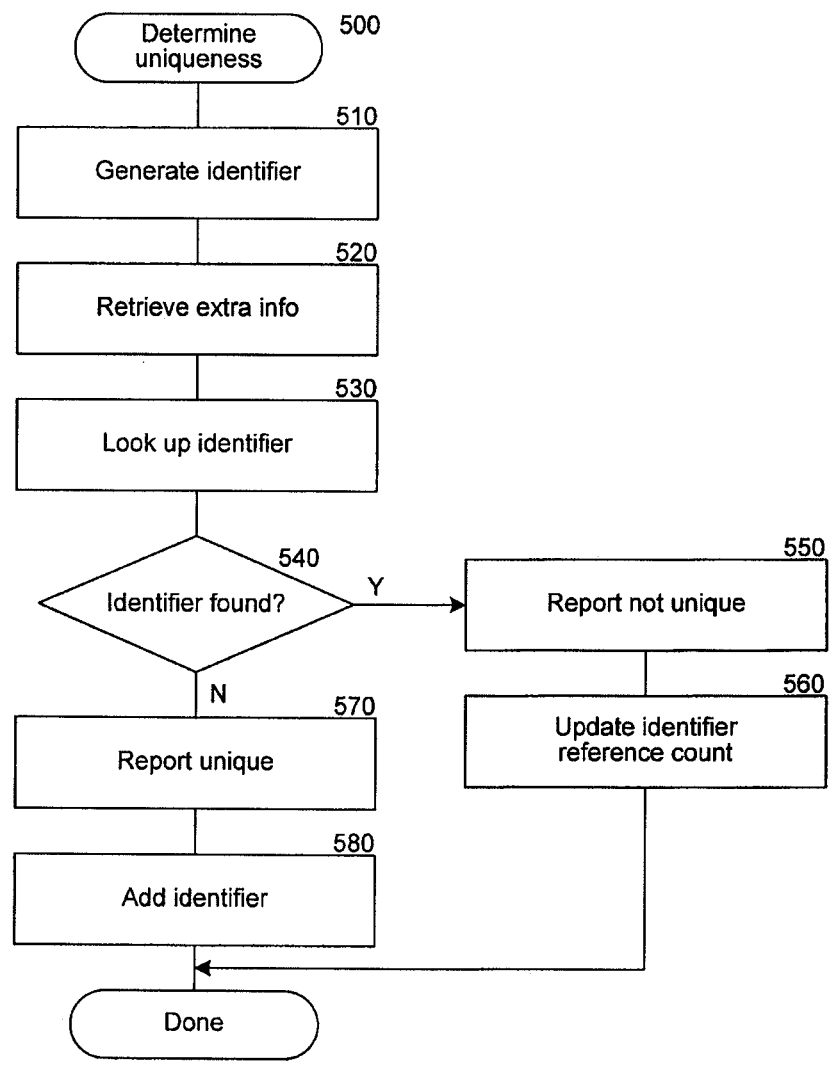
FIG. 5 is a flow diagram that illustrates processing of the single instancing system to determine whether a data object is unique, in one embodiment.
Figure 6:
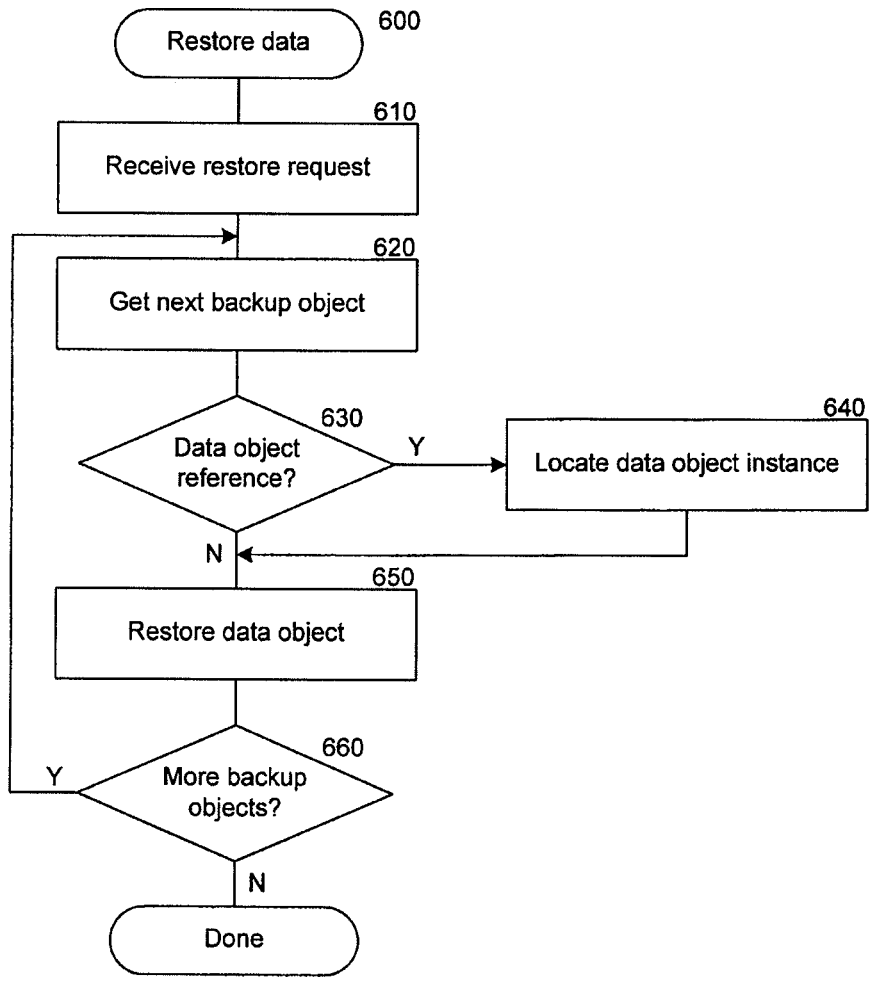
FIG. 6 is a flow diagram that illustrates processing of the storage operation manager component to restore data, in one embodiment.

FIGS. 4-6 are representative flow diagrams that depict processes used in some embodiments. These flow diagrams do not show all functions or exchanges of data, but instead they provide an understanding of commands and data exchanged under the single instancing system. Those skilled in the relevant art will recognize that some functions or exchange of commands and data may be repeated, varied, omitted, or supplemented, and other (less important) aspects not shown may be readily implemented.

FIG. 4 is a flow diagram that illustrates the processing of the storage operation manager component 160 of the single instancing system in one embodiment. The storage operation manager component 160 is invoked when a storage operation that creates a copy of a file is requested (e.g., when backing up the application file (block 400)). In block 410, the storage operation manager component 160 identifies data objects within the file to be copied, such as by using information about the application that created the file and the format used by the application to store data objects.

For example, the application may provide an object model that the storage operation manager component 160 can invoke to enumerate objects within the file, or the storage operation manager component 160 may understand the format used by the application for storing objects in the file. An application author, manufacturer or third party may also provide a module for parsing the application file that the storage operation manager component 160 can invoke. In this way, the application author, manufacturer or third party can provide access to the data objects within the file without exposing the actual format used to third parties.

In certain embodiments, the storage operation manager component 160 further identifies files or data objects from different applications that should be considered separately for de-duplication. For instance, the storage operation manager component 160 can identify one or more files or data objects from a first application or data format to be associated with a first de-duplication database, while identifying one or more files or data objects from a second application or data format to be associated with a second de-duplication database. In yet other embodiments, one or more agents 370 can perform one or more of the functions described above with respect to blocks 400 and/or 410.

In block 415, the storage operation manager component 160 selects the first identified data object. In block 420, the storage operation manager component 160 determines whether the data object is unique, or if the storage manager component has previously copied the data object. For example, the storage operation manager component 160 may compute a digest in the manner described herein, and compare the digest to the digests of previously copied data objects to determine if the data object is an instance of a previously copied data object. In decision block 430, if the data object is unique, then the storage operation manager component 160 continues at block 450, else the storage operation manager component 160 continues at block 440. In block 440, the storage operation manager component 160 adds a reference (e.g., to an index of data managed by the single instancing system, such as by incrementing a reference count in the index) to the already backed up instance of the data object, and then continues to block 460. In block 450, the component stores the unique data object. In decision block 460, if the storage operation manager component 160 identified more data objects within the file, then the storage operation manager component 160 loops to block 415 to select the next data object, else the storage operation manager component 160 completes.

FIG. 5 is a flow diagram that illustrates the processing of the single instancing system to determine whether a file or data object is unique, in one embodiment. These blocks may be invoked by the storage operation component 160, such as when performing a storage operation as described in FIG. 4 or at other times. In block 510, the identifier generation component 120 generates a substantially unique identifier of the file or data object that is the target of the storage operation. In block 520, the file identification component 110 gathers (for example, by querying the file system of a client) additional information about the file or data object, such as the file or data object's size, security information, or other attributes. In block 530, the identifier comparison component 130 determines if the substantially unique identifier of the file or data object and any supplemental information matches that of any existing file or data object tracked by the single instance database component 140.

In decision block 540, if the data objects match, then the single instancing system continues at block 550, otherwise the single instancing system continues at block 570. In block 550, the single instancing system reports to the entity that invoked the storage operation manager component 160 that the file or data object is not unique. In block 560, the single instancing system updates the substantially unique identifier reference count tracked by the single instance database component 140 and then concludes. In block 570, the single instancing system reports to the entity that invoked the storage operation manager component 160 that the file or data object is unique. In block 580, the single instancing system adds the file or data object's substantially unique identifier and other information to the list of files and data objects tracked by the single instance database component 140. The process then concludes.

FIG. 6 is a flow diagram that illustrates the processing of the storage operation manager component 160 to restore data, in one embodiment. The single instancing system invokes the storage operation manager component 160 when it receives a request, for example, to restore data. In block 610, the storage operation manager component 160 receives a request to restore data. In block 620, the storage operation manager component 160 selects the next file or data object referred to by the request. For example, the request may identify ten files or data objects, and the storage operation manager component 160 selects the first file or data object on which to perform the following blocks.

In decision block 630, if the selected file or data object is a reference to an instance of a file or data object stored somewhere else, then the storage operation manager component 160 continues at block 640, else the storage operation manager component 160 continues at block 650. In block 640, the storage operation manager component 160 locates the referenced instance of the file or data object and continues to block 655. In block 655, the storage operation manager component 160 restores the file or data object from the referenced instance of the file or data object. In block 650, the storage operation manager component 160 restores the file or data object directly from the file or data object. In decision block 660, if there are more files or data objects referred to by the received request, then the storage operation manager component 160 loops to block 620 to select the next file or data object on which to perform these blocks, else the storage operation manager component 160 completes.

Single Instance Continuous Data Replication

Where multiple computing systems containing data that is to be single instanced are located remotely from a single instancing database, various system configurations may be employed to avoid transferring data that is common to the remote multiple computing systems to the single instancing database. Three example configurations are described herein. Under a first configuration, a single instancing database is maintained at a first location and at each remote location (e.g., a second location, a third location, etc.). De-duplicated information in the single instancing database at each remote location is transferred to the single instancing database at the first location.

Under a second configuration, a single instancing database is maintained at a first location, and a computing system at each remote location (e.g., a second location, a third location, etc.) sends queries to the single instancing database at the first location to identify what data to transfer to the single instancing database. Under a third configuration, each computing system at each remote location (e.g., a second location, a third location, etc.) queries a single instancing database at a first location before transferring any data to the single instancing database. Each of these configurations is discussed separately below. In the discussed configurations, the example of a central or home office with one or more remote or satellite offices is used, where each remote office includes one or more computing systems. Although the terminology used to discuss these configurations implies a certain geographical positioning of computing systems, the single instancing system described herein may be used in a wide variety of configurations and is not limited to a specific geographical positioning.

Furthermore, the single instancing system described herein is not limited to the hub-and-spoke model implied by the terminology used to discuss these configurations. For example, a multi-tier hierarchical configuration could be employed, in which computing systems at the leaf nodes transfer data to computing systems at their respective parent nodes, which transfer data to computing systems at their parent nodes, and so on, up to the computing system at the top-most node of the hierarchy. As another example, a mesh configuration could be employed, in which a first computing system in the mesh configuration transfers data to a second computing system, the data to be ultimately transferred to a third computing system.

CDR, also called continuous data protection or continuous backup, refers to copying computer data by automatically saving a copy of every change made to that data, essentially capturing every version of the data that the user saves. It allows an administrator (or other user) to restore data to previous point(s) in time. There are multiple methods known in the art for capturing the continuous changes involving different technologies that serve different needs. CDR-based solutions can provide fine granularities of restorable objects ranging from disk images to logical data objects such as files, email data files, email messages, and database files and logs.

CDR differs from traditional backup or copy operation in that an administrator (or other user) does not have to specify the point in time to which the administrator would like to recover until the administrator is ready to perform a restore. Traditional backups or copy operations can only restore data to the point at which the backup or copy was made. With CDR, there are typically no backup or copy schedules. When data is written to disk, it can also be synchronously or asynchronously written to a second location, usually another computer over the network. In some situations, CDR will require less space on secondary storage media (usually disk) than traditional backup or copy operations. Most CDR solutions save byte- or block-level differences rather than file-level differences. This means that if one byte of a 100 GB file is changed, only the changed byte or block is backed up or copied. In contrast, traditional incremental and differential backups and copy operations generally make copies of entire files when those files change.

Figure 7:
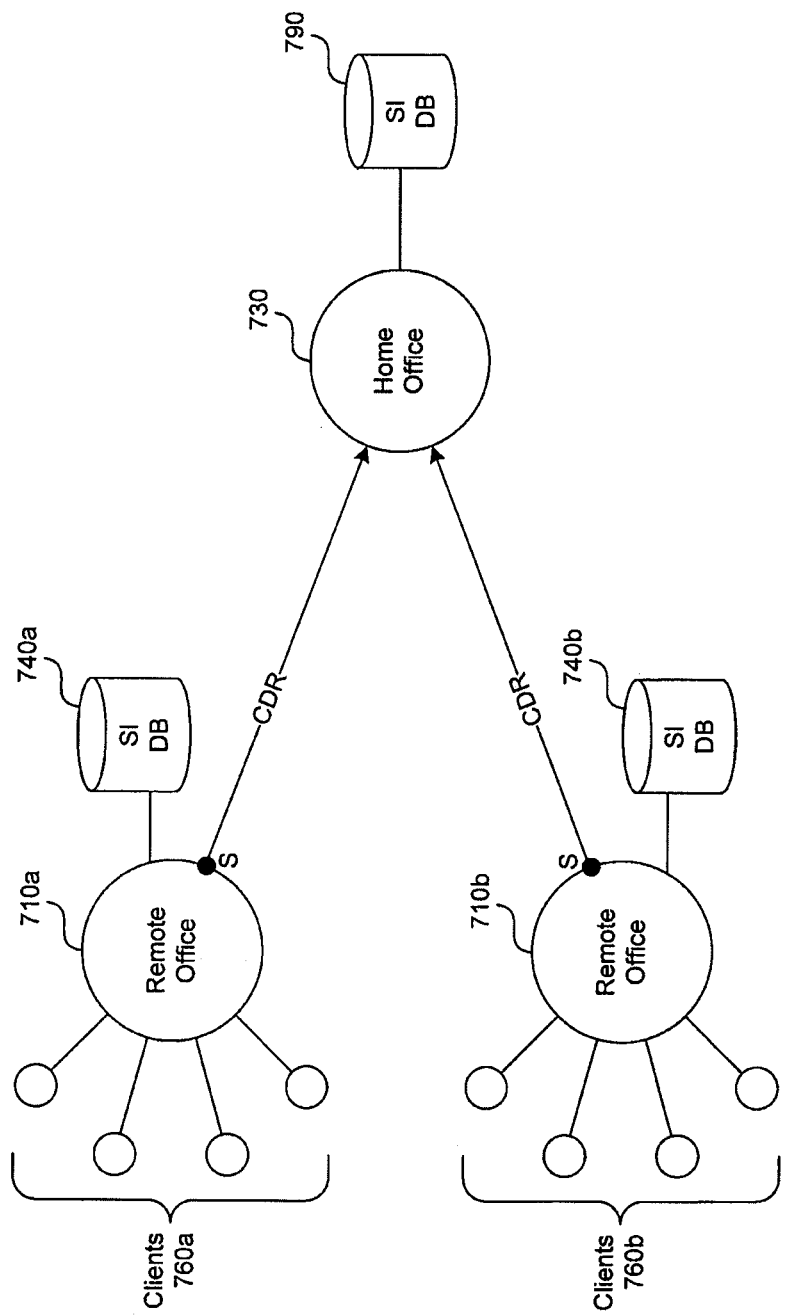
FIG. 7 is a block diagram that illustrates an environment in which the single instancing system may be configured to operate.

FIG. 7 illustrates an environment according to the first example configuration. In the environment of FIG. 7, two remote offices 710*a* and 710*b* are connected to a home office 730. Although FIG. 7 depicts two remote offices 710, only a single remote office, or more than two remote offices, may be connected to the home office 730. Each remote office includes its own single instance database 740. For example, remote office 710*a* includes single instance database 740*a* and remote office 720 includes single instance database 740*b*. Multiple client computing systems 760*a* and 760*b* at each remote office 710 provide data to the single instance database 740 at their respective locations.

Clients 760*a* are part of remote office 710*a*, and store data in single instance database 740*a*. Clients 760*b* are part of remote office 710*b*, and store data in single instance database 740*b*. The clients 760 may be connected to their respective remote office 710 by way of a local area network (wired or wireless), with the remote offices 710 being connected to the home office 730 by a wide area network, or other network such as a public computer network (e.g., the Internet). By employing known CDR techniques, data from each remote single instance database 740 is sent to the home office 730 to be stored in a central data store (not shown in FIG. 7) at the home office 730. Accordingly, data is copied from clients 760 to a local single instance database 740, and then data blocks unique to that remote office 710 are provided using CDR to create a copy at the home office 730.

Each remote office 710 tracks incremental changes for its clients 760, and then employs CDR to transmit those incremental changes to the home office 730. The home office 730 may then in turn employ its own single instance database 790 to avoid any duplication between the remote offices 710. For example, clients 760 that run MICROSOFT WINDOWS typically will each have a similar C:\Windows directory containing operating system files. Multiple client computing systems 760 will have stored a single copy of the C:\Windows directory at the remote single instance database 740, which will then be replicated to the central data store at the home office 730. The home office 730 will in turn store a single copy of the C:\Windows directory in the single instance database 790.

Figure 8:
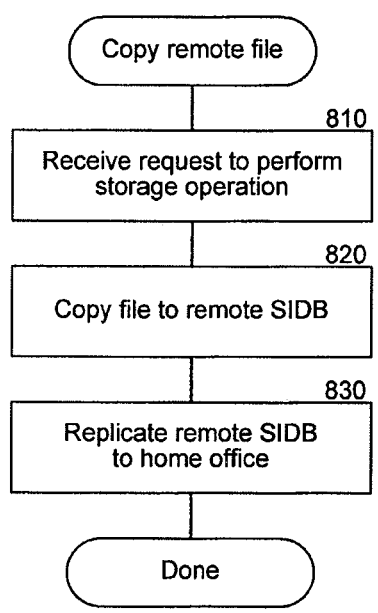
FIG. 8 is a flow diagram that illustrates copying a remote file or data object in the environment of FIG. 7

FIG. 8 is a flow diagram that illustrates copying a remote file or data object in the environment of FIG. 7. In block 810, the single instancing system receives a request to perform a storage operation. For example, the request may be a routinely scheduled request to backup or copy the contents of a client computing system 760. For each file or data object involved in the request, the single instancing system performs the following blocks. In block 820, the single instancing system copies the file or data object from the client computing system 760 to a single instance database 740 located at the remote office 710. The single instance database 740 ensures that only one copy of each file or data object is stored.

For example, the single instance database 740 may create or have created a substantially unique identifier for each stored file or data object and create or have created a substantially unique identifier for each new file or data object to be stored. The single instance database 740 may then compare the substantially unique identifier of the new file or data object with that of each previously stored file or data object to determine whether the new file or data object is already stored. In some embodiments, the single instance database 740 may store metadata that is specific to some clients while only storing one instance of the file or data object itself.

Accordingly, the client 760 copies data to a computing system that is geographically close, and then later the data from each client 760 can be copied to the home office 730 by copying the single instance or unique data from the single instance database 740 at the remote office 710. In this context, computing systems that are geographically close refers to computing systems that may be in the same room, in the same building or on the same campus. Computing systems that are geographically remote refers to computing systems that are not geographically close. In block 830, the single instancing system replicates the contents of the remote single instance database 740 to the home office 730. This block can be performed using CDR or other traditional methods of copying data. After block 830, these blocks conclude. Using this method, each remote single instance database 740 may send identical files or data objects to the home office single instance database 790 (i.e., data that is unique as to each individual remote office 710, but duplicative as to both remote offices 710). However, only one instance of each file or data object at the remote office 710 is stored by the home office single instance database 790.

Figure 9:
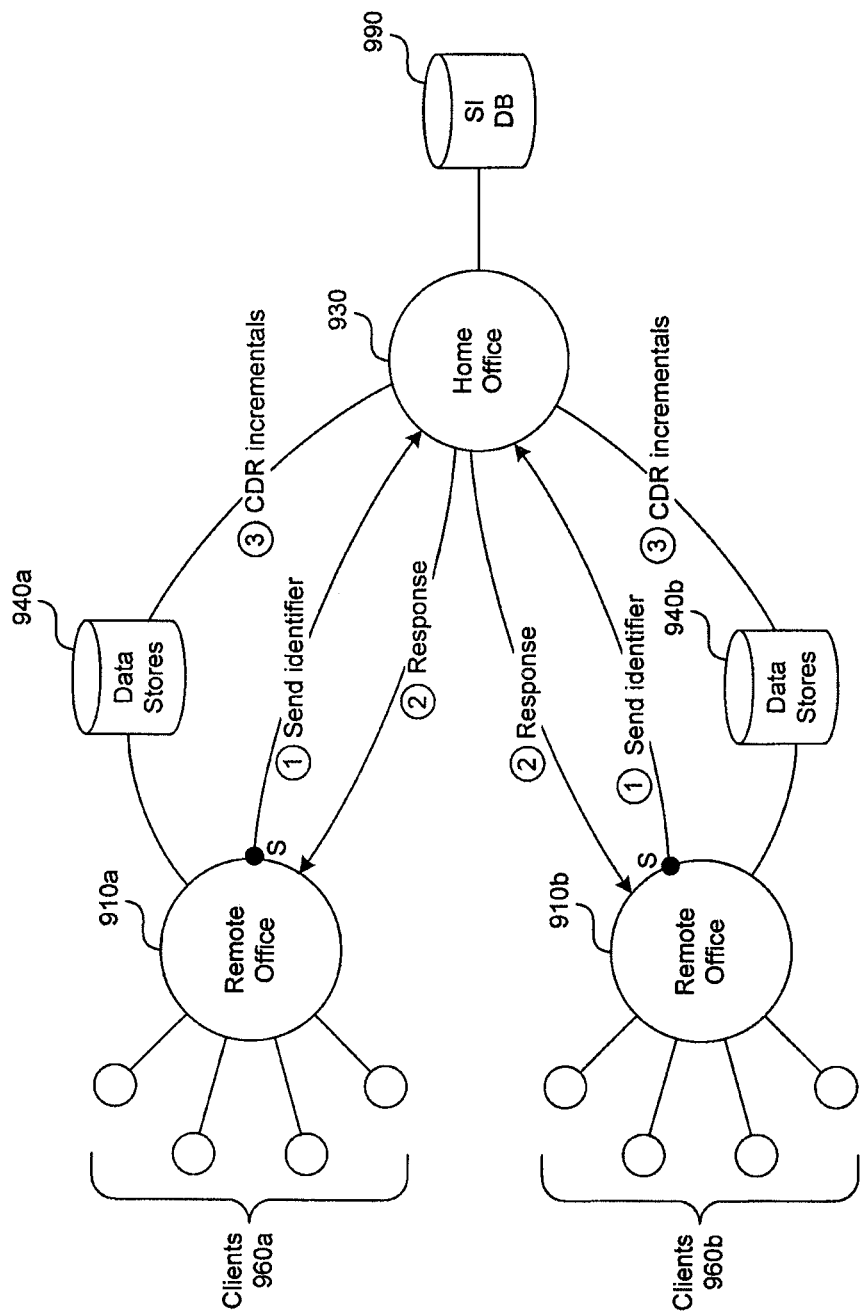
FIG. 9 is a block diagram that illustrates another environment in which the single instancing system may be configured to operate.

FIG. 9 illustrates an environment according to the second example configuration. In the environment of FIG. 9, two remote offices 910*a* and 910*b* are connected to a single home office 930. Although FIG. 9 depicts two remote offices 910, only a single remote office, or more than two remote offices, may be connected to the home office 930. Remote office 910 includes multiple client computing systems 960*a* and a data store 940*a*. Remote office 910*b* includes multiple client computing systems 960*b* and a data store 940*b*. The home office 930 maintains a single instance database 990. The remote office 910 generates a substantially unique identifier for each file or data object that is to be potentially stored.

For example, the remote office 910 may include a computing system (not shown in FIG. 9) that generates the substantially unique identifier for each file or data object that is to be potentially stored on behalf of clients 960. The remote office 910 then transmits the substantially unique identifier to the home office 930. The home office 930 checks the single instancing database 990 to determine whether the transmitted substantially unique identifier matches any existing substantially unique identifier in the single instance database 990 in order to determine whether the file or data object that is to be potentially stored is redundant. The home office 930 then sends a response back to the remote office 910 that indicates whether the file or data object that is to be potentially stored is unique. The remote office 910 stores the unique files or data objects locally in a data store 940. The remote office 910 then employs CDR to incrementally transfer new changes or updates to the home office 930.

The single instancing system may employ various optimization techniques. For example, the remote office 910 may cache substantially unique identifiers and only transmit one instance of a substantially unique identifier to the home office 930 if it detects more than one instance of the same substantially unique identifier. After the single instancing system has made a request to the single instance database 990 to determine if a particular file or data object is unique, the remote office 910 may cache the response so that subsequent identical files or data objects do not generate a new request to the single instance database 990. Rather, the single instancing system consults the cache first to determine if a previous request determined whether the file or data object is unique. If the cache responds that the file or data object is not unique, then the remote office 910 does not need to query the single instance database 990 to determine if the file or data object is unique.

Figure 10:
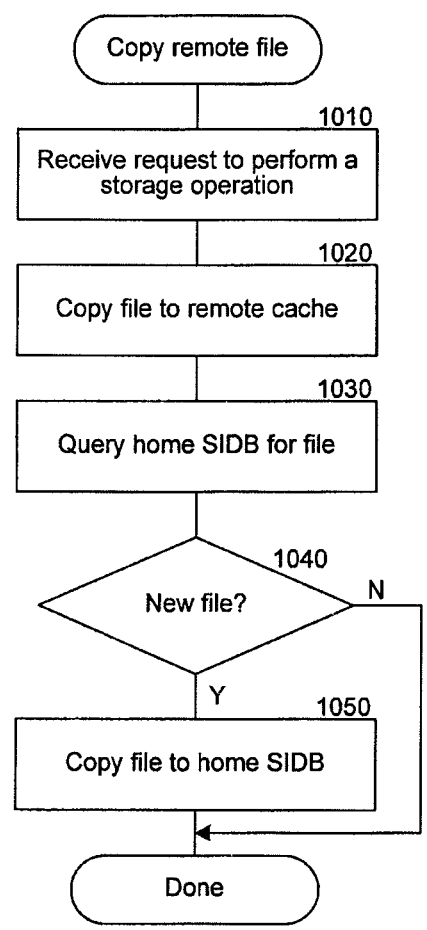
FIG. 10 is a flow diagram that illustrates copying a remote file or data object in the environment of FIG. 9.

FIG. 10 is a flow diagram that illustrates copying a remote file or data object in the environment of FIG. 9. In block 1010, the single instancing system receives a request to perform a storage operation. For each file or other data object involved in the request, the single instancing system performs the following blocks. In block 1020, the single instancing system copies the file or data object to a data management server (not shown in FIG. 9) that caches files or data objects at the remote office 910. Thus, the client copies data to a computing system that is geographically close. The data management server in this method may contain duplicate files or data objects from many clients 960. According to this method the data management server does not do single instancing of its own.

In block 1030, the single instancing system queries the single instance database 990 at the home office 930 to determine whether the single instance database 990 already has a copy of the file or data object. In decision block 1040, if the file or data object is new to the single instance database 990, then the single instancing system continues at block 1050, else these blocks conclude. In block 1050, the single instancing system copies the new file or data object to the single instance database 990. If there are duplicates of the file or data object, then later when the single instance database 990 is queried for the duplicate files or data objects, the single instance database 990 will indicate that the file or data object is not new and need not be copied. In this way, duplicate data is not sent to the home office 930. After block 1050, these blocks conclude. This method differs from the method of FIG. 8 in that duplicate data may be stored at the remote office 910, but duplicate data is not sent to the home office 930. In general, in comparison with the method of FIG. 8, the method of FIG. 10 will send more queries to the home office 930, but less data.

Figure 11:
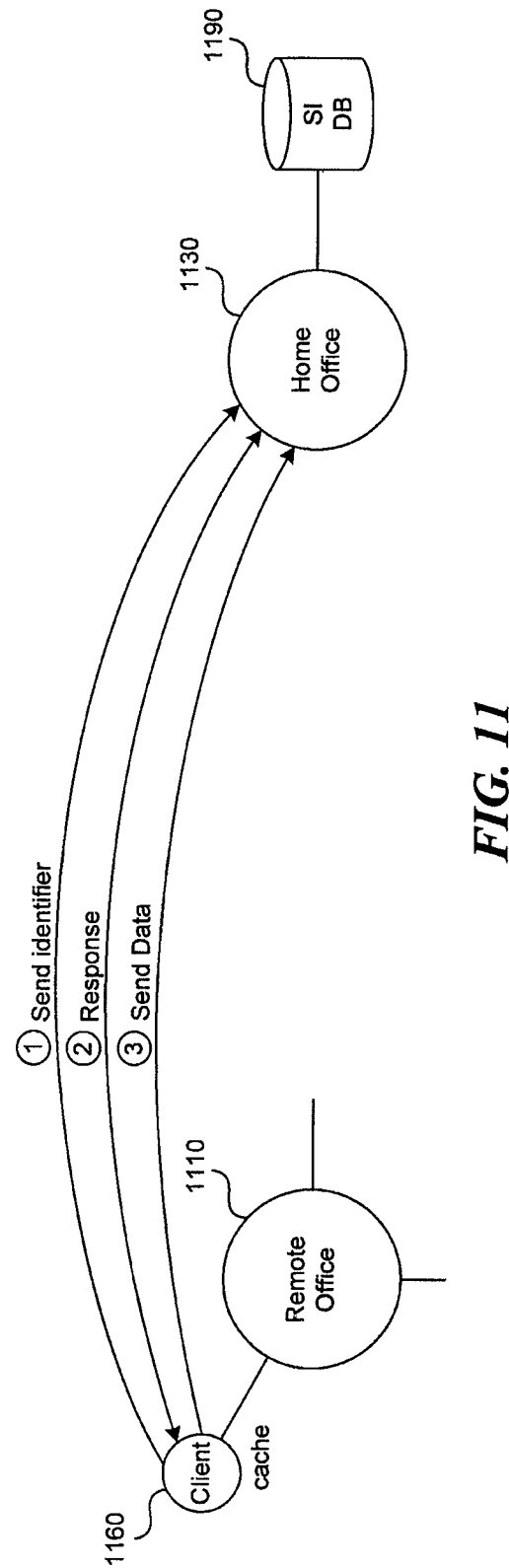
FIG. 11 is a block diagram that illustrates another environment in which the single instancing system may be configured to operate.

FIG. 11 illustrates an environment according to the third example configuration. In the environment of FIG. 11, each remote client 1160 (as opposed to each remote office 1110) transmits a query with a substantially unique identifier to the home office 1130. Each client 1160 may have generated the substantially unique identifier itself, or another computing system may generate them on behalf of the clients 1160. The single instance database 1190 determines whether the substantially unique identifier is already stored (i.e., indicating that the corresponding file or data object has previously been stored) and transmits a response to the client 1160. If the response indicates that the file or data object is new, then the client 1160 sends that file or data object to the home office 1130. The single instancing system typically does not employ CDR, and each remote office 1110 typically does not include a local data store used by its clients 1160. The single instancing system may employ caching for optimization at each client 1160. The home office 1130 also uses a single instance database 1190 to store only a single instance of each file or data object.

Figure 12:
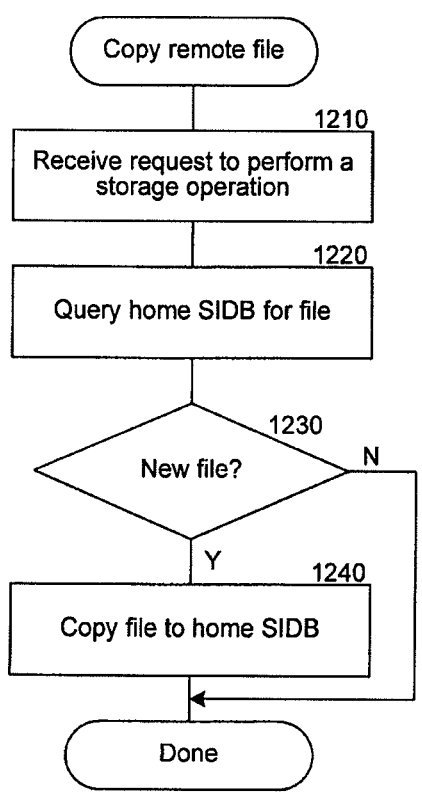
FIG. 12 is a flow diagram that illustrates copying a remote file or data object in the environment of FIG. 11.

FIG. 12 is a flow diagram that illustrates copying a remote file or data object in the environment of FIG. 11. In block 1210, the single instancing system receives a request to perform a storage operation. For each file or other data object involved in the request, the single instancing system performs the following blocks. In block 1220, the single instancing system queries the single instance database 1190 at the home office 1130 to determine whether the single instance database 1190 already has a copy of the file or data object. In decision block 1230, if the file or data object is new to the single instance database 1190, then the single instancing system continues at block 1240, else these blocks conclude. In block 1240, the single instancing system copies the new file or data object directly from the client 1160 to the single instance database 1190. In this way, duplicate data is not sent to the home office 1130. After block 1240, these blocks conclude. This method differs from the method of FIG. 10 in that the remote office 110 does not employ a remote file cache. Therefore, the method of FIG. 12 results in the sending of additional queries from the clients 1160 to the home office 1130 because each client 1160 will query the single instance database 1190.

As shown in FIGS. 7-12, the single instancing system does not always maintain a single instance database in the same location. Various benefits are derived by maintaining a single instance database in various locations. For example, a single instance database may be maintained in a production environment (for example, geographically close to production servers) so as to reduce the amount of time needed to single instance data or to reduce the amount of data to be transmitted between computing systems. The data stored in the single instance database may then be replicated to another single instance database or secondary storage.

CONCLUSION

From the foregoing, it will be appreciated that specific embodiments of the storage system have been described herein for purposes of illustration, but that various modifications may be made without deviating from the spirit and scope of the invention. For example, although backup operations have been described, the single instancing system may be used to reduce many types of redundant storage operations. As one example, the storage system may be employed by an Internet proxy server to reduce downloading of redundant files over the Internet by tracking a digest of each downloaded file and the location of a downloaded instance of the file behind the proxy server such that subsequent requests for the file can be serviced from the previously downloaded instance without accessing the file over the Internet. Similarly, the storage system could be used by a file system to reduce storage space by storing a single copy of data placed in multiple locations throughout the file system.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system for creating a backup copy of data, the system comprising:
   computer readable memory comprising at least a de-duplication database that stores at least one duplicate object existing in one or more files, the de-duplication database stores a single copy of the duplicate object in association with first client metadata, wherein the first client metadata identifies a first client, the first client metadata comprises at least first encryption data and first user access permissions associated with the duplicate object, wherein the first user access permissions are file access permissions that are different than the first encryption data,
   the de-duplication database further stores the single copy of the duplicate object in association with second client metadata, wherein the second client metadata identifies a second client, the second client metadata further comprises at least second encryption data and second user access permissions associated with the duplicate object, wherein the second user access permissions are file access permissions that are different than the second encryption data;
   a de-duplication module executing on one or more computer processors comprising computer hardware, the de-duplication module receives the one or more files and performs de-duplication as part of a backup, the de-duplication module further:
      uses de-duplication indicators in the files to identify the duplicate object and store the single copy of the duplicate object in the de-duplication database,
      uses the first and second encryption data to identify the duplicate object; and
      associates the duplicate object with the first and second user access permissions with the single copy of the duplicate object in the de-duplication database.

2. The system of claim 1 wherein the first and second client metadata identify differing operating systems.

3. The system of claim 1 wherein the first and second client metadata identify differing permissions.

4. The system of claim 1 wherein the one or more files comprise first application-specific data associated with a first application and second application-specific data associated with a second application.

5. The system of claim 4, further comprising a third module executing on one or more computer processors, wherein the third module:
   parses the second application-specific data that is different in format than the first application-specific data, the second application-specific data comprising a second plurality of data objects;
   identifies portions within the second plurality of data objects to be considered for de-duplication; and
   inserts at least one de-duplication identifier that identifies at least one location of identified portions in the second plurality of data objects to be considered for de-duplication.

6. The system of claim 1 wherein the de-duplication module further determines whether the duplicate object exists in a second de-duplication database.

7. The system of claim 6 wherein the de-duplication indicators identify that the second de-duplication database is to be used in de-duplicating application-specific data.

8. The system of claim 4 wherein:
   a first de-duplication database stores the single copy of a first duplicate object associated with the first application-specific data; and a second de-duplication database stores a single copy of a second duplicate copy of a second duplicate object associated with a second application-specific data, wherein the first de-duplication database is separate and different from the second de-duplication database.

9. The system of claim 8 wherein the de-duplication indicators indicate at least one of the first de-duplication database and the second de-duplication database.

10. The system of claim 4 wherein the first application-specific data is associated with an electronic mail server application.

11. A method for creating a backup copy of data, the method comprising:

storing in a de-duplication database at least one duplicate object existing in one or more files, the de-duplication database stores a single copy of the duplicate object in association with first client metadata, wherein the first client metadata identifies a first client, the first client metadata comprises at least first encryption data and first user access permissions associated with the single copy of the duplicate object, wherein the first user access permissions are file access permissions that are different than the first encryption data;

storing in the de-duplication database the single cop of the duplicate object in association with second client metadata, wherein the second client metadata identifies a second client, the second client metadata further comprises at least second encryption data, and second user access permissions associated with the single copy of the duplicate object, wherein the second user access permissions are file access permissions that are different than the second encryption data;

using de-duplication indicators to identify the duplicate object and store the single copy of the duplicate object in the de-duplication database;

using the first and second encryption data to identify the duplicate object; and associating the first and second user permissions with the single copy of the duplicate object in the de-duplication database.

12. The method of claim 11 wherein the first and second client metadata identify differing operating systems.

13. The method of claim 11 wherein the first and second client metadata identify differing permissions.

14. The method of claim 11 wherein the one or more files comprise data comprises first application-specific data associated with a first application and second application-specific data associated with a second application.

15. The method of claim 14 further comprising:

parsing the second application-specific data that is in a different format than the first application-specific data, the second application-specific data comprising a second plurality of second data objects;

identifying portions within a second plurality of second data objects to be considered for de-duplication; and inserting at least one de-duplication indicator that identifies at least one location of identified portions in the second plurality of data objects to be considered for de-duplication.

16. The method of claim 11 further comprising determining whether the duplicate object exists in a second de-duplication database.

17. The method of claim 16 wherein the de-duplication indicators identify that the second de-duplication database is to be used in de-duplicating application-specific data.

18. The method of claim 14 wherein:

a first de-duplication database that stores a single copy of a first duplicate object associated with the first application-specific data; and a second de-duplication database that stores a single copy of a second duplicate object associated with the second application-specific data, wherein the first de-duplication database is separate and different from the second de-duplication database.

19. The method of claim 18 wherein the de-duplication indicators indicate at least one of the first de-duplication database and the second de-duplication database.

20. The method of claim 14 wherein the first application-specific data is associated with an electronic mail server application.

* * * * *